United States Patent
Yamada et al.

(12) 
(10) Patent No.: US 6,751,167 B2
(45) Date of Patent: Jun. 15, 2004

(54) INFORMATION PLAYBACK APPARATUS

(75) Inventors: Yoichi Yamada, Saitama-ken (JP); Tomohiko Kimura, Saitama-ken (JP); Koichiro Sakata, Saitama-ken (JP); Takeaki Funada, Saitama-ken (JP); Hiroyuki Isobe, Saitama-ken (JP); Junichi Takagaki, Saitama-ken (JP); Tetsuya Kikuchi, Saitama-ken (JP); Gen Inoshita, Tokyo (JP); Ko Atsumi, Tokyo (JP)

(73) Assignee: Pioneer Corporation, Tokyo (JP)

( * ) Notice: Subject to any disclaimer, the term of this patent is extended or adjusted under 35 U.S.C. 154(b) by 192 days.

(21) Appl. No.: 10/151,961

(22) Filed: May 22, 2002

(65) Prior Publication Data
US 2002/0176327 A1 Nov. 28, 2002

(30) Foreign Application Priority Data
May 22, 2001 (JP) ........................................ 2001-152228

(51) Int. Cl.$^7$ ............................. G11B 21/08; G10H 7/00
(52) U.S. Cl. ................................. 369/30.19; 369/30.26; 84/636; 84/605
(58) Field of Search ........................... 369/30.26, 30.19, 369/47.13, 83, 30.05, 30.17, 53.31; 84/636, 612, 644, 605, 628

(56) References Cited

U.S. PATENT DOCUMENTS

| 5,350,882 A | 9/1994 | Kouguchi et al. | ............ 84/636 |
| 5,512,704 A | * 4/1996 | Adachi | ........................ 84/605 |

FOREIGN PATENT DOCUMENTS

| DE | 196 08 958 A1 | 3/1996 |
| EP | 0 999 553 A1 | 5/2000 |
| WO | WO 97 01168 | 1/1997 |
| WO | WO 00 21090 | 4/2000 |

OTHER PUBLICATIONS

Patent Abstracts of Japan Publication No. 55067967, May 22, 1980.
Patent Abstracts of Japan Publication No. 02304760, Dec. 18, 1990.
Patent Abstracts of Japan Publication No. 2000182318, Jun. 30, 2000.
Patent Abstracts of Japan Publication No. 06089501, Mar. 29, 1994.

* cited by examiner

Primary Examiner—Ali Neyzari
(74) Attorney, Agent, or Firm—Arent Fox Kintner Plotkin & Kahn

(57) ABSTRACT

An information playback apparatus is provided to obtain sound effects by using an optical disc in much the same way an analog record is manipulated. A pressing pressure applied onto a rotatable jog dial is detected by providing a pressure sensing layer to the jog dial. When no pressing pressure is applied onto the jog dial, audio information is played back from an optical disc at a normal tempo. When an end of the jog dial at rest is pressed with a pressing pressure within a predetermined range, a tempo of a playback sound played from the audio information is changed in response to the pressing pressure. When an end of the jog dial at rest is pressed with a large pressing pressure, a tempo of a playback sound played from the audio information is changed in such a manner that playback of a playback sound is stopped eventually. When the pressing pressure is released from the jog dial at rest, a tempo of a playback sound played back from the audio information is changed in such a manner that a playback sound is eventually played back at the normal tempo. Also, a tempo of a playback sound is changed in various manners in response to a pressing pressure onto the jog dial by providing manipulation keys for adjusting a quantity of change when changing a tempo of a playback sound in response to the level of a detection signal.

5 Claims, 14 Drawing Sheets

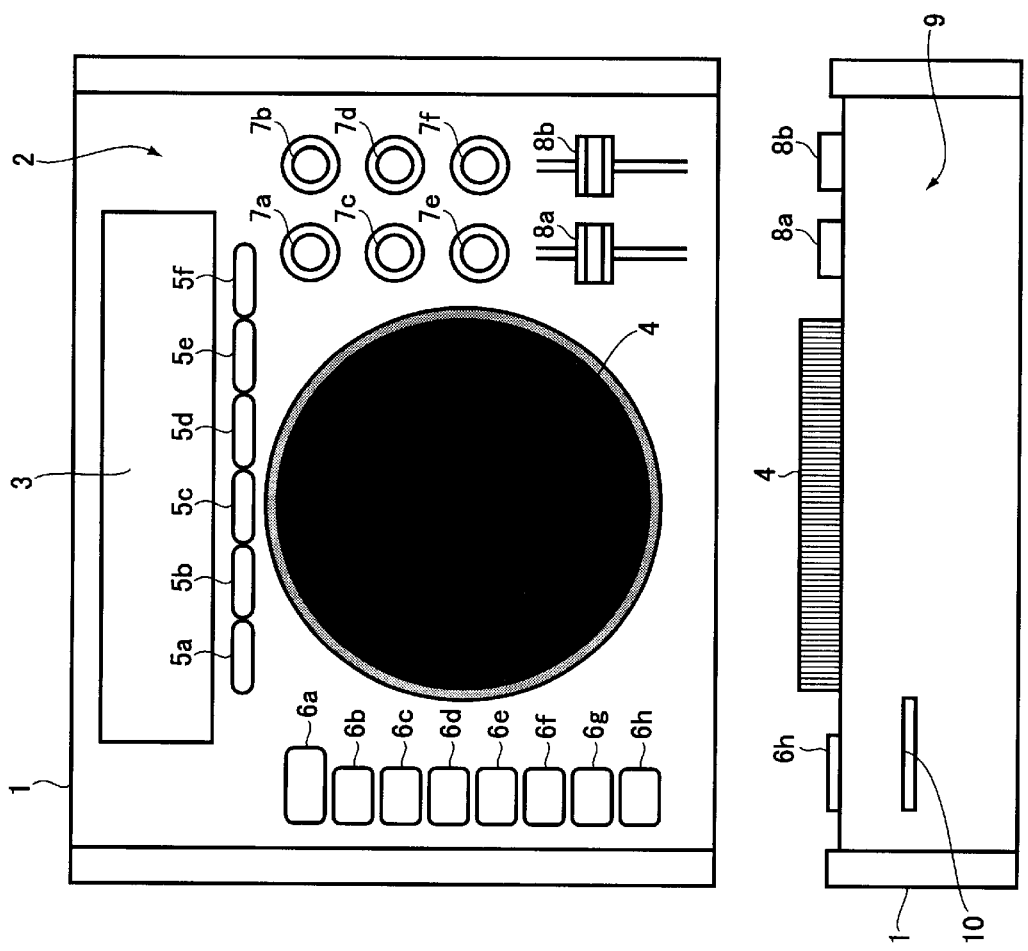
FIG.1 (a)
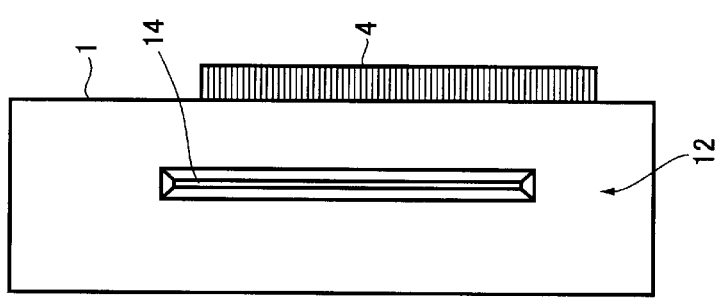
FIG.1 (b)
FIG.1 (c)

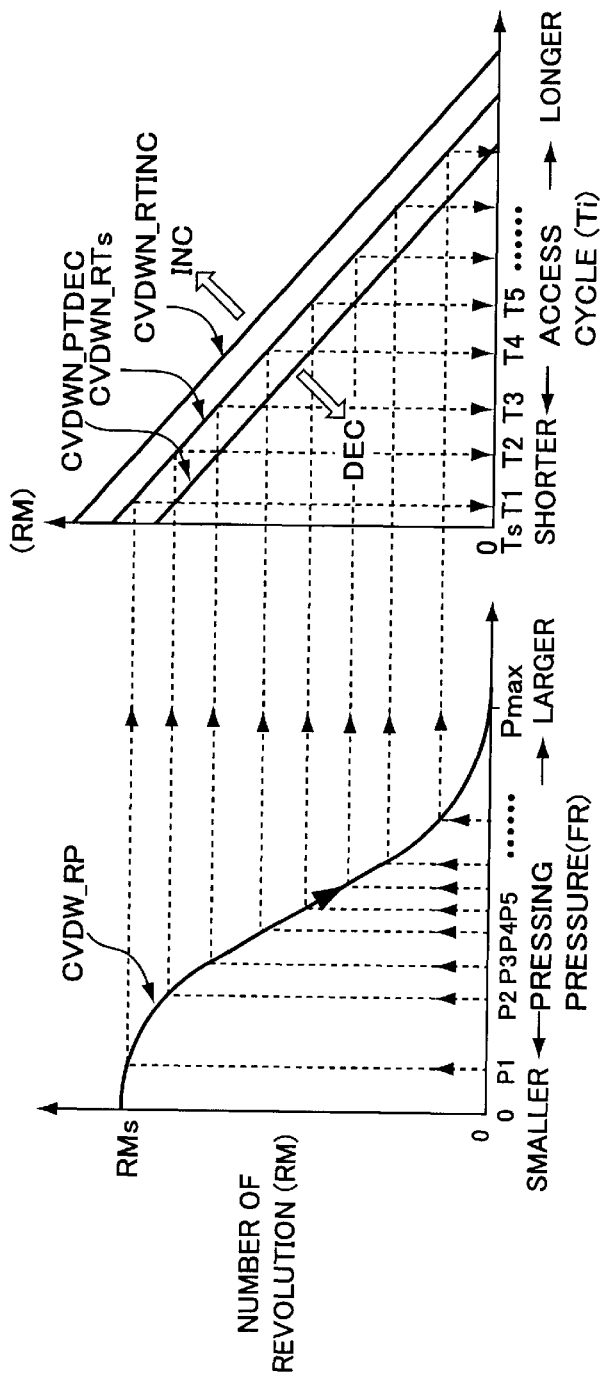
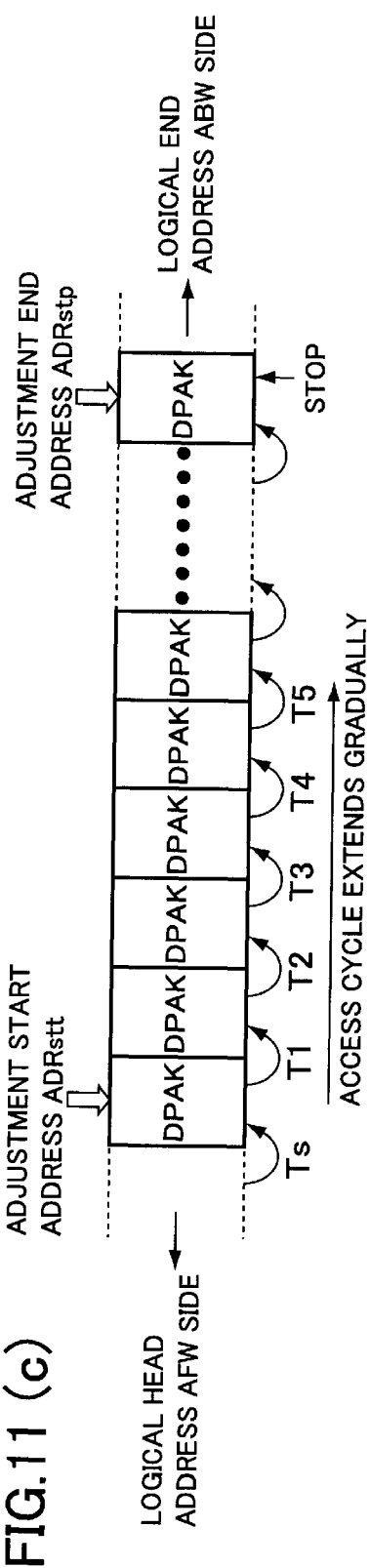
FIG.11 (a)
FIG.11 (b)
FIG.11 (c)

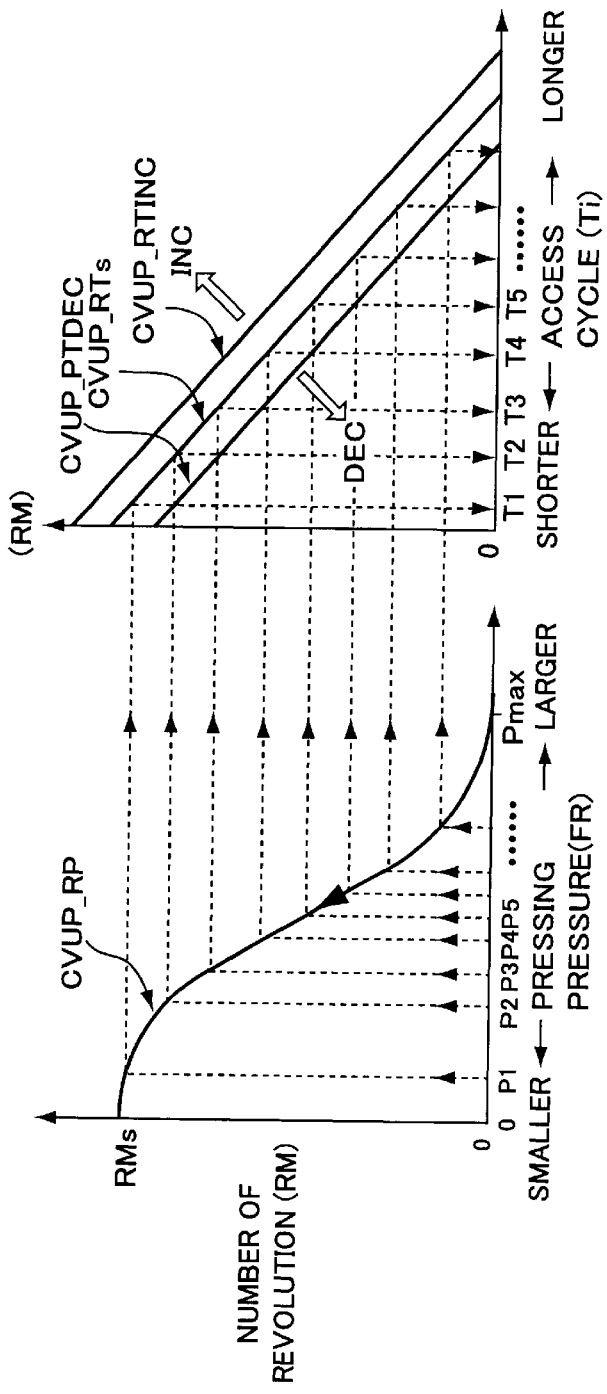
FIG.12 (a)
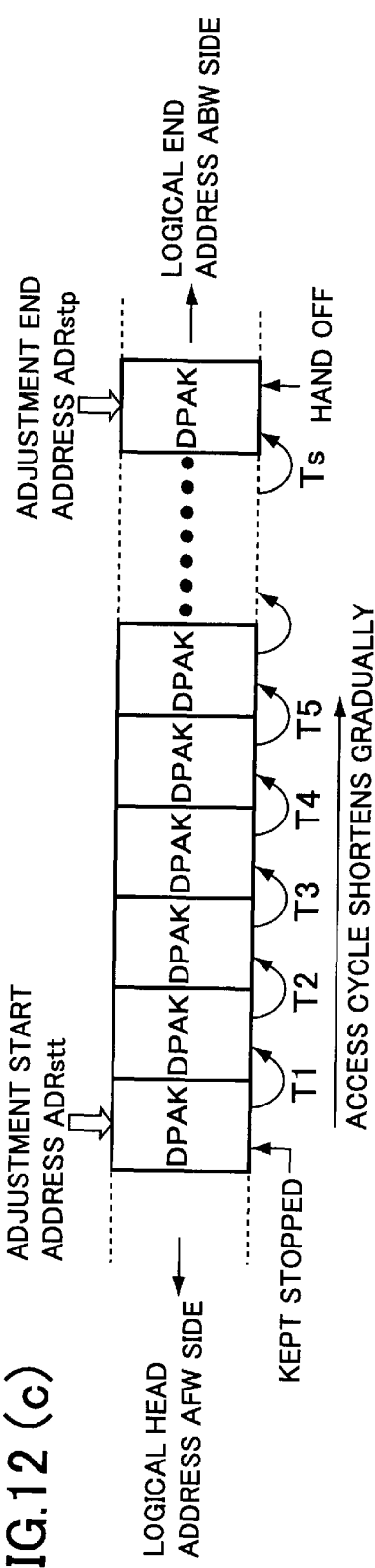
FIG.12 (b)
FIG.12 (c)

INFORMATION PLAYBACK APPARATUS

BACKGROUND OF THE INVENTION

The present invention relates to an information playback apparatus for playing back audio information, such as music and voices, while applying effects processing to generate sound effects.

The present application claims priority from Japanese Application No. 2001-52228, the disclosure of which is incorporated herein by reference for all purposes.

There has been known a performance technique for performing effects processing to impart various sound effects to a playback sound, according to which a rotational direction and a rotational speed of an analog record, such as an LP record, being played by an analog record player are changed forcefully by applying a load by hand onto the turntable on which the analog record is placed.

For example, as a sight seen in a discotheque or the like, a performer called a disc jockey imparts various sound effects to a playback sound played back from an analog record by performing manipulations, such as turning the turntable forcefully in the forward direction or in the reverse direction at speeds different from the original number of revolutions, and further stopping the turning turntable forcefully or turning the turntable at rest.

Incidentally, storage media adopting the digital recording method, such as a CD (Compact Disc) and a DVD (Digital Versatile Disc), become popular with the development of the digital technique, and there has been an increasing need for a technique which allows the user to perform the effects processing with these storage media in much the same way a conventional analog record is manipulated.

However, because information is played back from the storage media, such as a CD or a DVD, with a special digital technique which cannot be perceived by a human sense, there is a problem, for example, that the effects processing cannot be performed as desired (by manipulating a CD being played by a CD player) as an analog record in the same manner.

SUMMARY OF THE INVENTION

The present invention was devised to solve the conventional problems, and therefore, has an object to provide an information playback apparatus for achieving the effects processing with a storage medium having recorded information digitally, such as a CD and a DVD, in the same way as an analog record is manipulated. Also, the present invention has another object to provide an information playback apparatus which allows the user to feel as if he/she were imparting sound effects to a playback sound played back from an analog record in response to the movement of the turntable provided in an analog record player.

In order to achieve the above and other objects, an information playback apparatus of the present invention is an information playback apparatus for producing a playback sound to which sound effects are imparted by applying an editing process to audio information fed from a source, including: detecting device for detecting an absence or a presence of a physical touch or a pressing pressure on a manipulation unit and outputting a detection signal; and editing device for changing a tempo of the playback sound in response to a level of the detection signal outputted from the detecting device.

According to the information playback apparatus arranged as above, when the manipulator of the information playback apparatus touches or keeps out of touch, or presses the manipulation unit, the detecting device detects the absence or presence of physical touch or a pressing pressure on the manipulation unit and outputs a detection signal. Then, the editing device changes a tempo of a playback sound in response to the level of the detection signal when it produces the playback sound from the audio information.

Consequently, it is possible to generate the same sound effects obtained when the manipulator turns the turntable of an analog record player at the varying number of revolutions by applying a pressing pressure or the like on the turntable or by touching the turntable, stops the turning turntable by applying a pressing pressure or the like, allows the turntable (forcefully stopped by a pressing pressure or the like applied thereon) to resume turning by releasing the pressing pressure or the like, etc.

Also, because the tempo of the playback sound changes in response to a pressing pressure or the like acting on the manipulation unit, the manipulator can generate sound effects as if he/she were pressing the turntable of the analog record player, etc.

The editing device changes the tempo of the playback sound in response to the increasing or decreasing level of the detection signal.

According to the information playback apparatus described above, the tempo of the playback sound changes when the pressing pressure or the like applied onto the manipulation unit increases or decreases. Consequently, it is possible to generate the same sound effects produced when the manipulator moves his/her hand off the stopped turntable, or stops the turning turntable by hand. The information playback apparatus further includes adjusting device for adjusting a quantity of change when the tempo of the playback sound is changed in response to the level of the detection signal.

According to the information playback apparatus described above, the correspondence between the tempo of the playback sound and a pressing pressure or the like is adjusted. Consequently, for example, even when the same pressing pressure is applied to the manipulation unit, it is possible to change the tempo of the playback sound by pre-adjusting a quantity of change with the adjusting device. Also, by pre-adjusting a quantity of change with the adjusting device, it is possible to generate the same sound effects produced when the manipulator changes the movement of the turntable by moving his/her hand off the stopped turntable, or when the manipulator changes the movement of the turntable by stopping the turning turntable by hand.

Hence, it is possible to provide desired versatility in generating various sound effects by adjusting a quantity of change with the adjusting device as has been described.

The editing device stops producing the playback sound when the level of the detection signal has increased to exceed a predetermined value.

According to the information playback apparatus arranged as above, it is possible to generate the same sound effects produced when the manipulator stops the turning turntable by hand in such a manner that the number of revolutions of the turntable decreases gradually to stop the turntable eventually until a playback sound is no longer played.

The detecting device is provided to a rotatable rotary body for detecting a pressing pressure applied onto the rotary body.

According to the information playback apparatus arranged as above, when the manipulator presses the rotary body, he/she can feel as if he/she were pressing the turntable of the analog record player.

BRIEF DESCRIPTION OF THE DRAWINGS

These and other objects and advantages of the present invention will become clear from the following description with reference to the accompanying drawings, wherein:

FIGS. 1(a) through 1(c) are views showing an arrangement as to an outward appearance of an audio editing apparatus according to an embodiment of the present invention;

FIGS. 11(a) through 11(c) are views explaining adjustment processing of an access cycle in the ring buffer memory, performed when a pressing pressure onto the jog dial is increasing;

FIGS. 12(a) through 12(c) are views explaining adjustment processing of an access cycle in the ring buffer memory, performed when a pressing pressure onto the jog dial is decreasing;

DETAILED DESCRIPTION OF THE PREFERRED EMBODIMENTS

Figure 2:
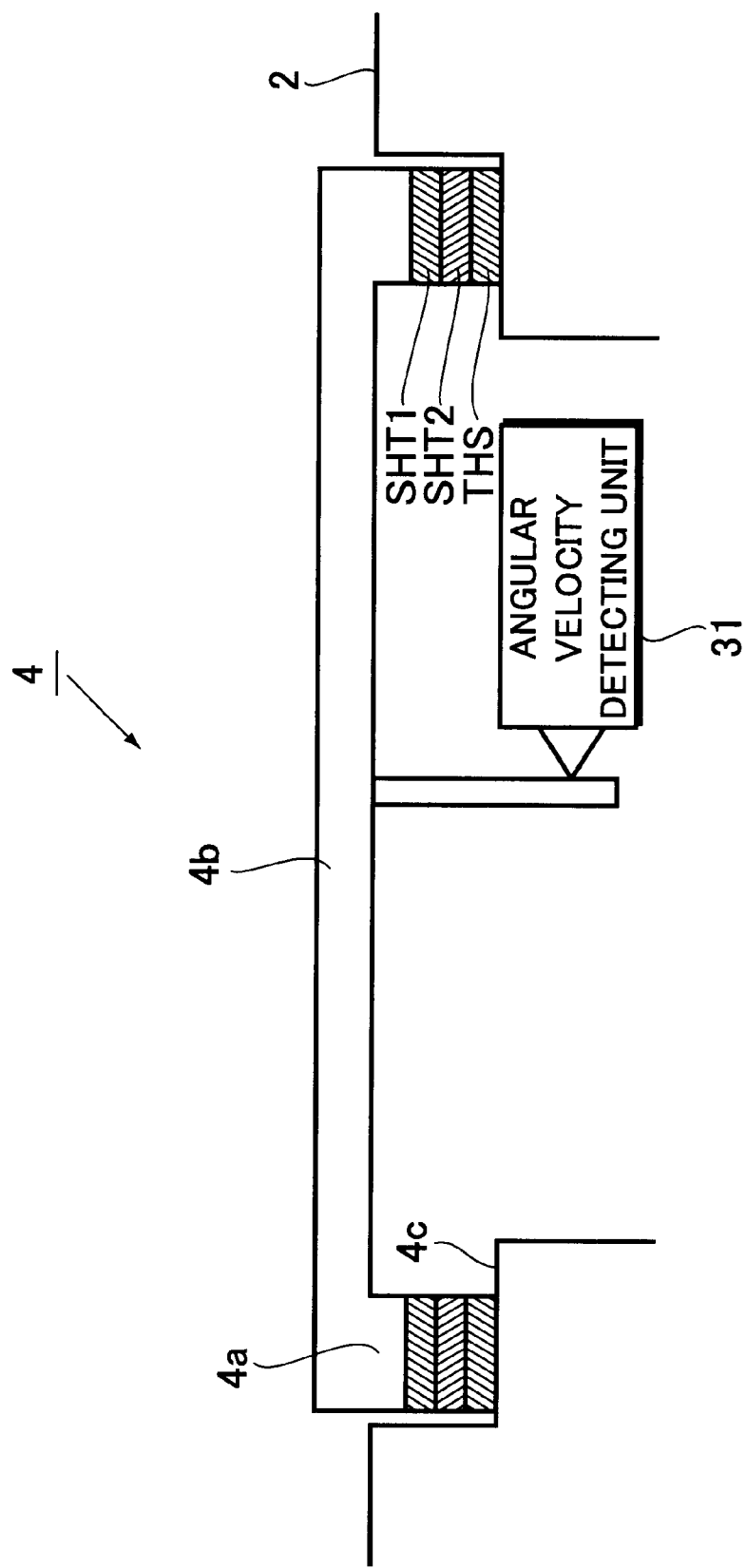
FIG. 2 is a longitudinal section showing a structure of a jog dial.

The following description will describe an embodiment of an information playback apparatus of the present invention with reference to the drawings.

The information playback apparatus of the present embodiment is capable of performing the effects (edits) processing to impart various sound effects to audio information supplied from a source, and therefore, is referred to as an audio editing apparatus hereinafter.

FIGS. 1(a) through 1(c) are views showing an arrangement as to an outward appearance of an audio editing apparatus 1. Referring to FIG. 1(a), a manipulation surface 2 of the case of the audio editing apparatus 1 is provided with a display unit 3, a jog dial 4, and a plurality of manipulation keys 5a through 5f, 6a through 6h, 7a through 7h, 8a, and 8b.

As shown in FIG. 1(b), a memory card slot 10 for inserting and removing a re-attachable memory card incorporating a semiconductor memory is provided to a side surface 9 of the case of the audio editing apparatus 1 when viewed from the front. Further, as shown in FIG. 1(c), a slit-wise disc insertion opening 14 for inserting and removing a CD or a DVD (hereinafter, referred to collectively as the optical disc) is provided to a side surface 12 of the case of the audio editing apparatus 1 when viewed from a sideway.

When an optical disc is inserted into the disc insertion opening 14, an auto-loading mechanism provided at the back of the disc insertion opening 14 automatically activates, and transports the optical disc to a clamping position provided under or almost under the jog dial 4 to place the optical disc into a hub unit provided to a driving axis of a spindle motor 16 (see FIG. 3) described below. Then, when the manipulation key 5a is depressed, the spindle motor 16 starts to rotate in a predetermined direction and a disc playback unit 15 (see FIG. 3) furnished with an effects processing function described below starts to play back audio information (hereinafter, referred to as data) recorded in the optical disc.

When the depressed manipulation key 5a is pressed again, the spindle motor 16 stops rotating, and the disc playback unit 15 stops playing the optical disc.

When the manipulation key 5b called an eject button is depressed, the auto-loading mechanism becomes an unloading condition, and transports the optical disc placed at the clamping position to the outside of the disc insertion opening 14.

The display unit 3 is composed of a liquid crystal display, and displays an operation status of the audio editing apparatus 1 and a manipulation menu for the user under the control of a system controller 29 (see FIG. 3) described below.

The jog dial 4 is a rotatable disc-wise rotary member, and is provided to variably set a playback speed and a playback direction when the disc playback unit 15 plays back a playback sound by reading the data recorded in the optical disc.

FIG. 2 is a cross section showing a longitudinal section structure along the center of rotation of the jog dial 4. In the drawing, the jog dial 4 is a disc-wise cylinder with a bottom composed of a cylindrical outer circumference portion 4a and a circular top portion 4b, which are made into one body by means of plastic molding. The cylindrical outer circumference portion 4a is fit into a cylindrical concave cutout portion 4c provided to the case of the audio editing apparatus 1 in a slidable manner. Further, a ring of a thin plate sealing member SHT1, which conforms to the shape of a ring-wise bottom surface of the outer circumference portion 4a, is laminated to the bottom surface of the outer circumference portion 4a.

A pressure sensing layer THS made of a dielectric material which senses a pressure to serve as detecting device is fixedly adhered to the top surface of the concave cutout portion 4c at the case side, and further, a sealing member SHT2 having the same shape as the sealing member SHT1 is laminated onto the top surface of the pressure sensing layer THS.

The sealing members SHT1 and SHT2 are made of an easy-to-slide plastic material, which allows the jog dial 4 to rotate in the circumferential direction. Also, when the user presses the top portion 4b of the jog dial 4, the pressure sensing layer THS senses a pressing pressure, and supplies a detection signal STHS at a level corresponding to the pressing pressure to the system controller 29.

In the present embodiment, a pressing pressure applied onto the jog dial 4 is detected as a change in a resistance value of the pressure sensing layer THS made of the dielectric material. However, a mechanical switch having a normally open contact or a normally closed contact, or an electrostatic capacity detecting sensor for detecting a change in an electrostatic capacity may be used.

An arrangement of the disc playback unit 15 for operating in response to the manipulation of the jog dial 4 will be described below, and initially, an explanation will be given to typical functions achieved when the user manipulates the jog dial 4. In order to facilitate the understanding of the functions of the jog dial 4, an explanation will be given with reference to the cases when the user performs the effects processing by manipulating an analog record player.

1. Function Achieved When the Jog Dial 4 is Untouched at Rest [Function 1]

When the user allows the jog dial 4 to stay at rest without touching the same, the disc playback unit 15 performs a normal playback operation standardized in the optical disc. Consequently, a normal playback sound is produced based on the data recorded in the optical disc, and it is possible to obtain the same playback sound as would be obtained, for example, when an LP record is played normally at 33 rpm (that is the predetermined number of revolutions).

2. Function Achieved When an End of the Jog Dial at Rest is Pressed With a Pressing Pressure Within a Predetermined Range [Function 2]

When the user presses an end of the jog dial 4 at rest with a pressing pressure within a predetermined range, it is possible to change a tempo of a playback sound in response to the pressing pressure. To be more specific, it is known that when a load is applied by hand onto the turntable on which an analog record is placed, the rotational speed of the turntable is reduced, thereby slowing down a tempo of a playback sound played back from the analog record. Similarly, when the user presses an end of the jog dial 4 at rest, it is possible to change a tempo of a playback sound in response to the pressing pressure, and as a consequence, the user can feel as if he/she were playing an analog record.

3. Function Achieved When an End of the Jog Dial at Rest is Pressed With a Large Pressing Pressure [Function 3]

When the user presses an end of the jog dial 4 with a predetermined large pressing pressure without rotating the jog dial 4, that is, when the user presses the jog dial 4 with a pressing pressure Pmax larger than the aforementioned pressing pressure within the predetermined range, it is possible to stop the playback operation, and the user can feel as if he/she forcefully stopped the turning turntable of an analog record player.

In other words, when the turning turntable of an analog record player is stopped forcefully by hand, a relative movement of a stylus with respect to an analog record stops, whereupon the playback operation stops and a playback sound is no longer produced. Similarly, when the user applies the predetermined large pressing pressure Pmax to the jog dial 4, it is possible to stop the playback operation, that is, the production of a playback sound.

4. Function Achieved When the User Moves His/Her Hand off the Jog Dial at Rest After Applying a Large Pressing Pressure at an End [Function 4]

When the user moves his/her hand off the jog dial 4 without rotating the same after applying a predetermined large pressing pressure at an end thereof, it is possible to resume the playback operation. As a consequence, the user can feel as if he/she were moving his/her hand off the forcefully stopped turntable of an analog record player, so that the turntable starts to turn again to resume playing the analog record.

5. Function Achieved When the Jog Dial is Rotated [Function 5]

When the user manipulates the jog dial 4 to rotate manually while pressing the jog dial 4 with the large pressing pressure Pmax larger than the aforementioned pressing pressure within the predetermined range, it is possible to set a forward playback and a reverse playback according to a rotational direction, and further, it is possible to change a tone of a playback sound played at a speaker or a headphone in response to a rotational speed (angular velocity) of the jog dial 4.

In other words, when the user rotates the jog dial 4 while pressing the jog dial 4 with the large pressing pressure Pmax, the user can feel as if he/she were turning the turntable provided to an analog record player by hand against a driving force of a turntable driving motor to play a playback sound depending on a quantity of turning manipulation.

The forward playback referred to herein means to play back the data in the optical disc in the order of the recorded stream in the same manner when music or the like is played by rotating an analog record, such as an LP record, in the forward direction.

Hence, the disc playback unit 15 performs the forward playback as the jog dial 4 is manipulated to rotate clockwise.

The reverse playback referred to herein means to play back the data in the optical disc in the reverse order of the recorded stream in the same manner when music or the like is played by rotating an analog record in a reverse direction.

In other words, because music or the like is recorded continuously (analog recording) in an analog record, when the analog record is rotated in the reverse direction, music or the like is played in the reverse direction as an imitation sound different from the original music or the like. Similarly, when the jog dial 4 is manipulated to rotate counterclockwise, the disc playback unit 15 plays back the individual data which are digitally recorded in the optical disc in the reverse order of the stream, and produces the same imitation sound generated when an analog record is played in the reverse rotational direction.

It should be noted, however, that the disc playback unit 15 does not turn the optical disc itself in the reverse direction during the reverse playback, and is arranged to achieve the advantages equivalent to those attained when an analog record is rotated in the reverse direction by batch processing described below.

The manipulation keys 5c, 5d, and 5e are referred to as cue buttons, and are provided to perform the so-called cue point setting.

When the user depresses the manipulation key 5c while the optical disc is being played, the system controller 29 described below stores the elapsed track time at that playback point as a cue point. Also, by storing the elapsed track time for each playback point as the cue point each time the manipulation key 5c is depressed, it is possible to set the elapsed track time of a plurality of playback points as cue points.

When the user depresses the manipulation key 5d, the cue point stored in the system controller 29 is displayed on the display unit 3, and further, when the user depresses the manipulation key 5e, the playback operation is started from the cue point (that is, the elapsed track time) displayed on the display unit 3 as the beginning position.

The cue points stored in the system controller 29 are sequentially advanced and displayed successively on the display unit 3 each time the manipulation key 5*d* is depressed. Hence, the user can start the playback operation wherever he/she wants by setting the desired elapsed track time as the beginning position by manipulating the manipulation keys 5*c*, 5*d*, and 5*e* as needed.

Herein, the system controller 29 obtains sub-code data recorded in the optical disc as the control data, and finds the elapsed track time from Q channel code data contained in the sub-code data.

The manipulation key 5*f* is provided to specify the start of the effects processing with respect to the disc playback unit 15. The disc playback unit 15 starts the effects processing when the user depresses the manipulation key 5*f*, and terminates the effects processing when the user depresses the manipulation key 5*f* again.

Although a detailed description of the rest of the manipulation keys 6*f* through 6*h* is omitted for ease of explanation, these keys are provided so that the user can selectively specify various functions furnished with the audio editing apparatus 1 as needed.

The manipulation keys 7*a* through 7*f* are provided to direct the disc playback unit 15 to apply various kinds of effects processing to playback data. The user can specify a method of the effects processing by changing a rotational angle of each of the manipulation keys 7*a* through 7*f*.

Each of the manipulation keys 7*a* through 7*d* is formed from a 3-position rotary switch, and the user can switch the positions as needed to a "first specified position" and a "second specified position" provided to specify the method of the effects processing, and to an "OFF position" provided between the first and second specified positions to release the effects processing.

When the manipulation key 7*a* is switched to the "first specified position", the effects processing is performed as an audio editing unit 26 (see FIG. 3) provided to the disc playback unit 15 modulates playback data with a saw-tooth waveform, and when the manipulation key 7*a* is switched to the "second specified position", the effects processing is performed as the audio editing unit 26 modulates the playback data with a rectangular waveform. Also, when the manipulation key 7*b* is switched to the "first specified position", the effects processing is performed as the audio editing unit 26 modulates the playback data to trigger the Doppler effect, and when the manipulation key 7*b* is switched to the "second specified position", the effects processing is performed as the audio editing unit 26 modulates the playback data with a special waveform which imitates a sound of a jet plane. When the manipulation keys 7*a* and 7*b* are switched to the "OFF position", the audio editing apparatus 26 releases the modulation processing. Also, the manipulation keys 7*c* and 7*d* are of the same arrangement and furnished with the same functions as the manipulation keys 7*a* and 7*b*.

The manipulation key 7*e* is formed from a rotary variable resistor, and is provided as adjusting device for adjusting a quantity of change in a tempo of a playback sound when the user manipulates for any of aforementioned [Function 2], [Function 3], [Function 4], and [Function 5] by pressing the jog dial 4 during the playback operation by aforementioned [Function 1].

In other words, it is known that when the user applies a load onto the turntable of an analog record player by hand while the turntable is turning at the normal number of revolutions, the turntable moves in response to the load, which changes a tempo of a playback sound as a result. Similarly, when the jog dial 4 which has not been pressed is pressed, it is possible to change a tempo of a playback sound, and the user can feel as if he/she were manipulating the turntable to move in response to an applied load.

If the user pre-adjusts the resistance value of the manipulation key 7*e*, there can be offered the same advantages attained when the movement of the turntable is changed in various manners, thereby making it possible to change a tempo of a playback sound in various manners.

The manipulation key 7*f* is formed from a rotary variable resistor, and is provided as the adjusting device for adjusting a quantity of change in a tempo of a playback sound when the user moves his/her hand off the jog dial 4 when he/she manipulates for aforementioned [Function 4] or under the condition of any of aforementioned [Function 2], [Function 3], and [Function 5].

In other words, the manipulation key 7*f* is provided to set a change in a tempo of a playback sound when the user moves his/her hand off the jog dial 4 while he/she is pressing the jog dial 4 at rest or he/she is pressing, and at the same time, rotating the jog dial 4 (the condition of any of [Function 2], [Function 3], and [Function 5]), or the user moves his/her hand off the jog dial 4 while he/she is applying a large pressing pressure onto the jog dial 4 at rest (in the case of [Function 4]).

For example, it is known that when the user moves his/her hand off the turntable while he/she keeps stopping the turntable of an analog record player forcefully by applying a load onto the turntable, or while he/she is turning the turntable at the number of revolutions different from the normal number of revolutions, the turntable moves in trying to return to the normal number of revolutions by receiving a driving force of the turntable driving motor. Similarly, when the user moves his/her hand off the jog dial 4, it is possible to change a tempo of a playback sound, and the user can feel as if he/she were manipulating the turntable to move in returning to the normal number of revolutions.

If the user pre-adjusts the resistance value of the manipulation key 7*f*, there can be offered the same advantages attained when the user varies the movement of the turntable by moving his/her hand off the turntable, thereby making it possible to change a tempo of a playback sound in various manners.

Figure 3:
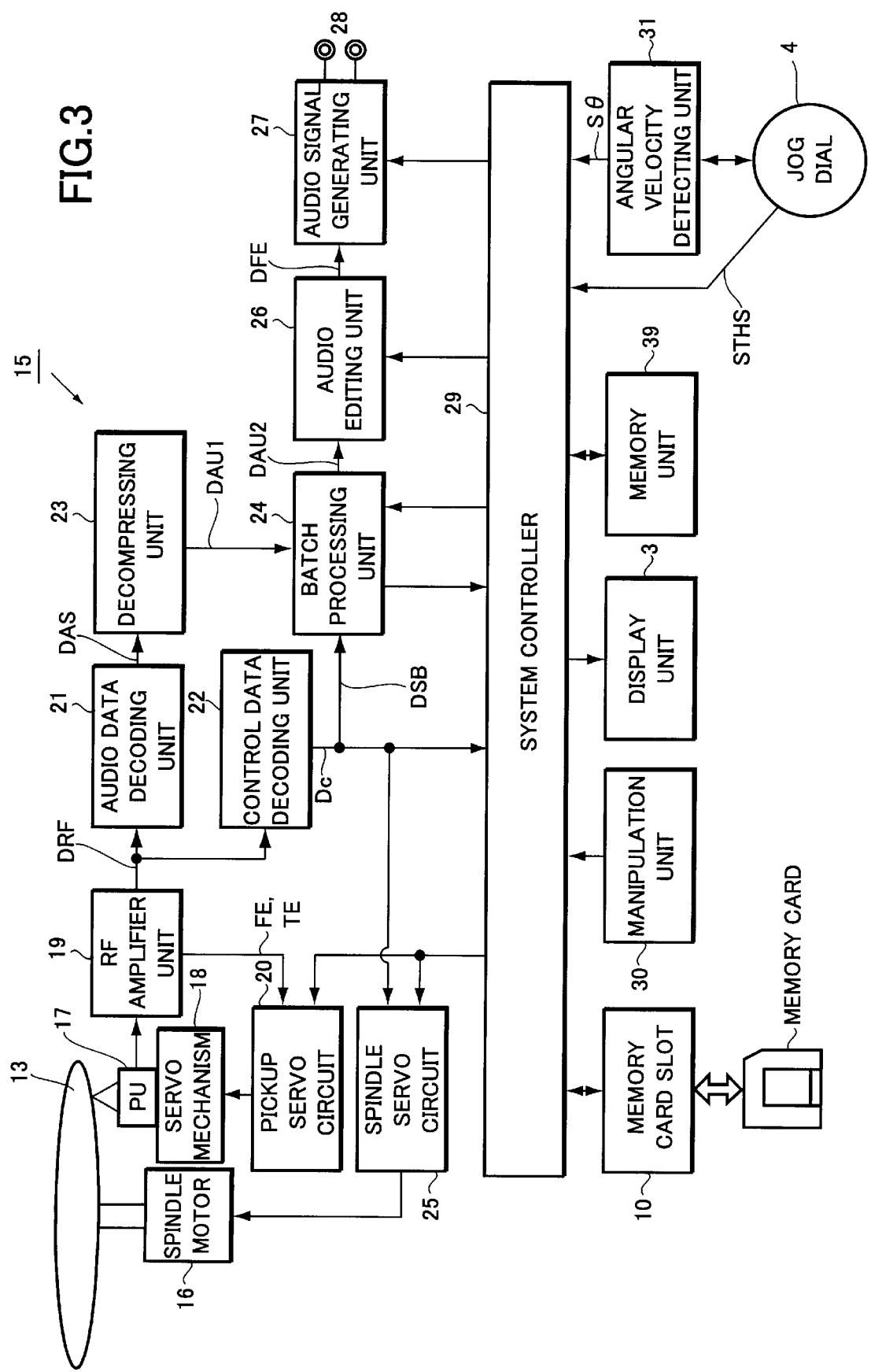
FIG. 3 is a block diagram showing an arrangement of a disc playback unit provided to the audio editing apparatus.

The manipulation key 8*a* is provided to adjust a volume of a playback sound outputted from a speaker or a headphone, and the volume is adjusted by adjusting a gain in a power amplifier (not shown) provided to an audio signal generating unit 27 in FIG. 3 depending on a quantity of manipulation with respect to the manipulation key 8*a*. The volume is turned up when the manipulation key 8*a* is pushed in a direction to move away from the user, and the volume is turned down when the manipulation key 8*a* is pulled toward the user.

The manipulation key 8*b* is provided to adjust a tempo of a playback sound outputted from a speaker or a headphone. In other words, a tempo of a playback sound is accelerated when the manipulation key 8*b* is pushed in a direction to move away from the user depending on a quantity of pushing manipulation, and a tempo of a playback sound is slowed down when the manipulation key 8*b* is pulled toward the user depending on a quantity of pulling manipulation. In other words, by playing a playback sound in a fast-forwarding playback or a slow-forwarding playback depending on a quantity of manipulation with respect to the manipulation key 8*b*, it is possible to change a tempo of a playback sound.

The adjustment of a tempo of a playback sound is achieved by adjusting the readout timing of playback data from a ring buffer memory (see FIG. 4) 32 provided to a batch processing unit 24 in FIG. 3. In other words, many data read out from the optical disc are stored temporarily into the ring buffer memory 32 as playback data, and the readout timing of the playback data from the ring buffer memory 32 is adjusted depending on a quantity of manipulation with respect to the manipulation key 8b, whereby a tempo of a playback sound is adjusted.

Then, the data are read out at fast timing depending on a quantity of manipulation when the manipulation key 8b is pushed in a direction to move away from the user, and the data are read out at slow timing depending on a quantity of manipulation when the manipulation key 8b is pulled towards the user.

The playback data read out at the timing depending on a quantity of manipulation with respect to the manipulation key 8b are supplied to the audio signal generating unit 27 by way of the audio editing unit 26, and the data are subjected to digital-to-analog conversion at a predetermined sampling frequency by a digital-to-analog converter (not shown) provided to the audio signal generating unit 27 to be supplied to a power amplifier, which substantially changes a sampling rate of the digital-to-analog converter, thereby changing a tempo of a playback sound outputted from the power amplifier and played at a speaker or a headphone.

Next, the following description will describe an arrangement of the disc playback unit 15 provided within the case of the audio editing apparatus 1 with reference to FIG. 3.

Referring to FIG. 3, provided at the aforementioned clamping position are the spindle motor 16 for rotating the optical disc 13 in a predetermined direction, a pickup 17 for optically reading out data from the optical disc 13 and outputting a resulting readout signal, and a servo mechanism 18 for effecting servo control onto the pickup 17 to perform an adequate optical reading while moving in the direction of the radius of the optical disc 13 in a reciprocating manner.

Further, the disc playback unit 15 is provided with an RF amplifier unit 19 and a pickup servo circuit 20. When the RF amplifier unit 19 generates an error signal, such as a focus error signal FE and a tracking error signal TE, from a readout signal outputted from the pickup 17, the pickup servo circuit 20 effects feedback control onto the servo mechanism 18 to control the occurrence of an error, such as a focus error and a tracking error. Also, the pickup servo control 20 controls an operation of the servo mechanism 18 to move the pickup 17 to a recording track in the optical disc 13 as specified by the system controller 29.

Further, the RF amplifier unit 19 restores data recorded in the optical disc 13 from the readout signal outputted from the pickup 17 in the form of an RF signal DRF, and supplies the same to an audio data decoding unit 21 and a control data decoding unit 22.

The audio data decoding unit 21 decodes the RF signal DRF according to a format standardized in each optical disc 13, isolates and extracts an audio stream DAS contained in the RF signal DRF, and supplies the same to a decompressing unit 23. Further, the decompressing unit 23 decompresses information in the audio stream DAS compressed according to the compression standards, such as the MPEG, AC-3, and MP3, and supplies decompressed playback data DAU1 to the batch processing unit 24.

The control data decoding unit 22 decodes the RF signal DRF according to the format standardized in each optical disc 13, isolates and extracts control data Dc contained in the RF signal DRF, and supplies the same to the batch processing unit 24, a spindle servo circuit 25, and the system controller 29.

At this point, various kinds of control data, such as synchronizing data and sub-code data, recorded as being contained in the audio stream DAS are isolated and extracted as the control data Dc, and the sub-code data DSB are supplied to the batch processing unit 24, the synchronizing data are supplied to the spindle servo circuit 25, and all the control data Dc are supplied to the system controller 29.

The spindle servo circuit 25 detects an error in the synchronizing data with respect to a rotational speed of the spindle motor 16 specified by the system controller 29, and effects the feedback control onto rotations of the spindle motor 16 so as to control the occurrence of an error.

Figure 4:
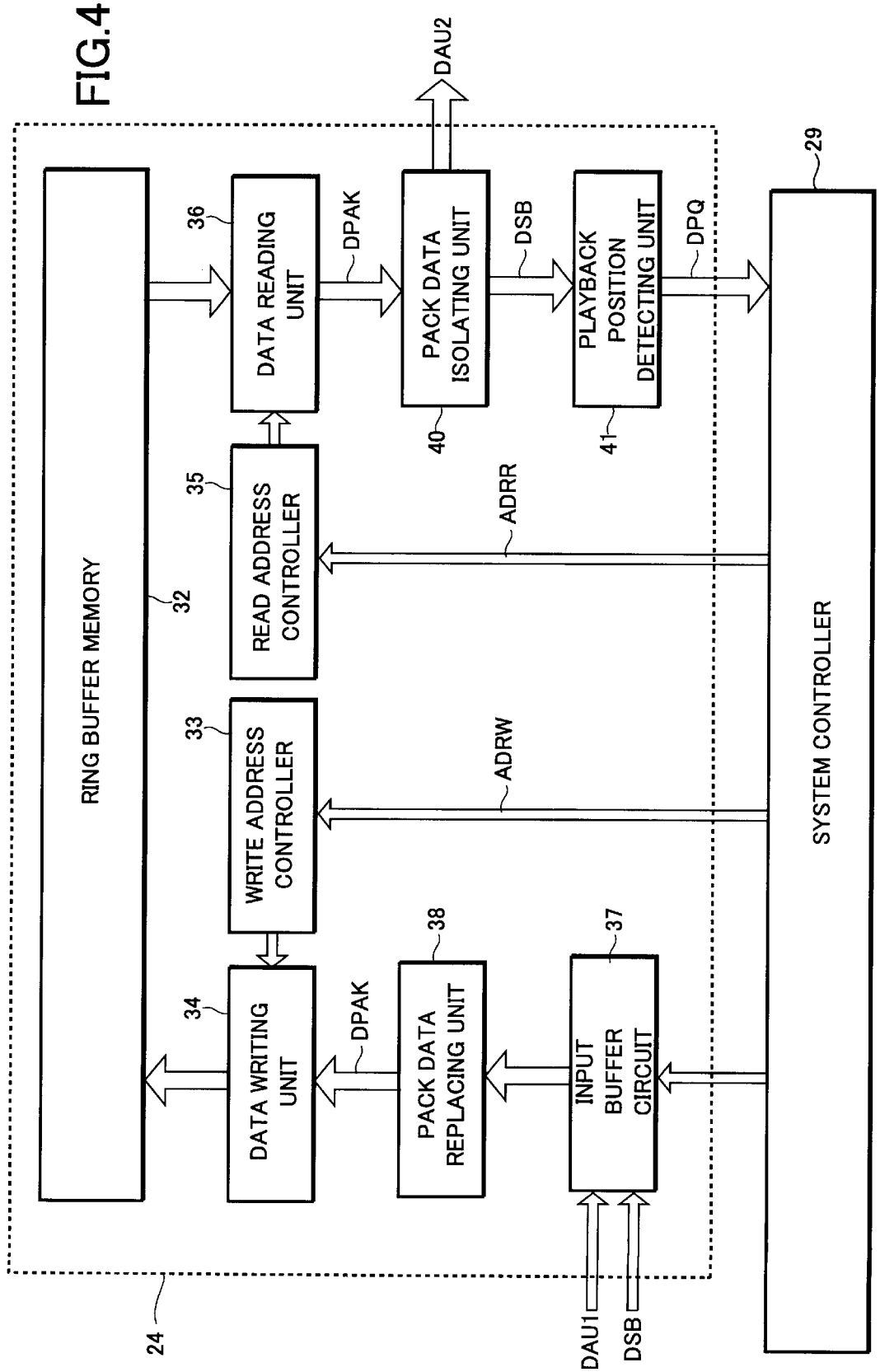
FIG. 4 is a block diagram showing an arrangement of a batch processing unit provided to the disc playback unit.

The batch processing unit 24 is of an arrangement shown in FIG. 4, and is provided with the ring buffer memory 32, a write address controller 33, a data writing unit 34, a pack data replacing unit 38, and an input buffer circuit 37.

The input buffer circuit 37 buffers temporarily the sub-code data DSB and the playback data DAU1, which are supplied successively in sync with each other from the control data decoding unit 22 and the decompressing unit 23, respectively.

Figure 5:
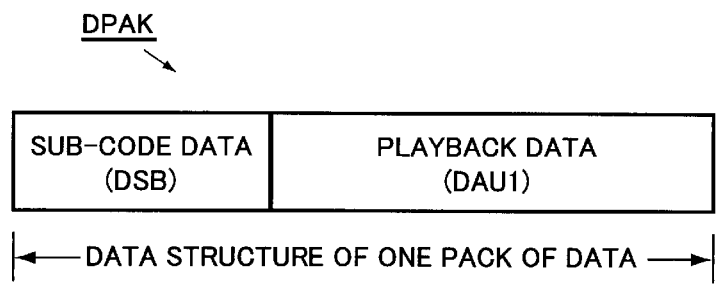
FIGS. 5(a) through 5(c) are views showing an arrangement of a ring buffer memory provided to the batch processing unit.
Figure 5:
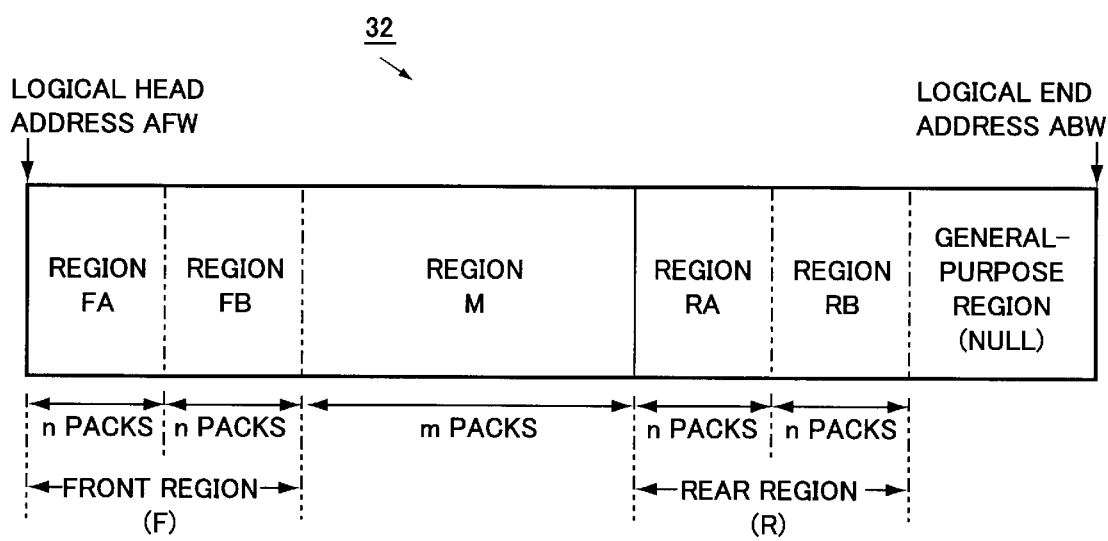
Figure 5:
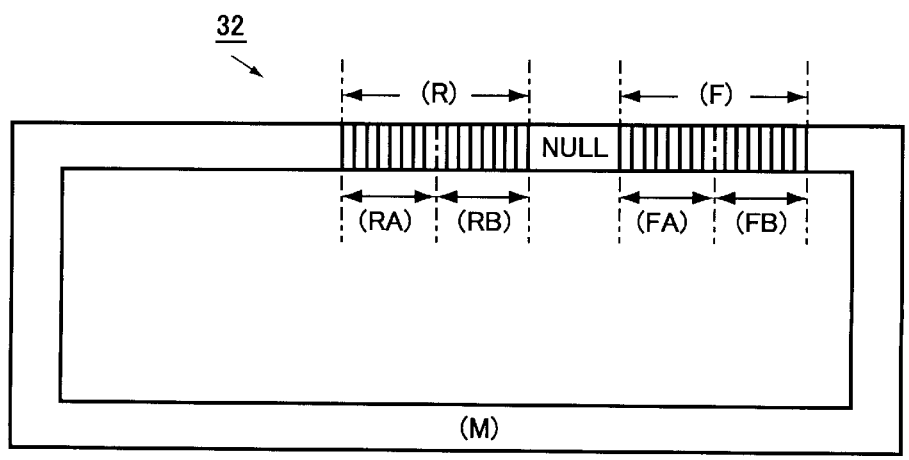

The pack data replacing unit 38 generates pack data DPAK of a predetermined data structure as shown in FIG. 5(a) having the buffered sub-code data DSB and playback data DAU1 in a one-to-one correspondence to be successively outputted.

The write address controller 33 sets a write address in the ring buffer memory 32 according to write address control data ADRW supplied from the system controller 29.

The data writing unit 34 stores the pack data DPAK generated in the pack data replacing unit 38 at the write address in the ring buffer memory 32 set by the write address controller 33.

Further, the batch processing unit 24 is provided with a read address controller 35, a data reading unit 36, a pack data isolating unit 40, and a playback position detecting unit 41.

Here, the read address controller 35 sets a read address in the ring buffer memory 32 according to read address control data ADRR supplied from the system controller 29.

The data reading unit 36 reads out the recorded pack data DPAK from the ring buffer memory 32 at the read address set by the read address controller 35.

The pack data isolating unit 40 isolates the sub-code data DSB and the playback data DAU1 from the read out pack data DPAK, and supplies the isolated sub-code data DSB to the playback position detecting unit 41 while supplying the isolated playback data DAU1 to the audio editing unit 26 as playback data DAU2.

The playback position detecting unit 41 detects the elapsed track time at the point (current point) when the playback data DAU2, having been processed by the audio editing unit 26 and the audio signal generating unit 27, are finally played as a playback sound at a speaker or a headphone by extracting the Q channel code data in the sub-coded data DSB, and supplies the elapsed track time data DPQ thus detected to the system controller 29.

As has been described, the batch processing unit 24 makes the batch processing possible by performing the write processing for generating the pack data DPAK from the playback data DAU1 and the sub-code data DSB played back from the optical disc 13 to be stored into the ring buffer memory 32, and the read processing for reading out the recorded pack data DPAK from the ring buffer memory 32 to be restored into the playback data DAU2 and the sub-code data DSB independently.

The ring buffer memory 32 is composed of, for example, a 64-Mbyte SDRAM, and as shown in FIG. 5(b), a front region F, a main memory region M, a rear region R, and a general-purpose region NULL are allocated in a data memory region from a logical head address AFW to a logical end address ABW.

The front region F is composed of two regions FA and FB each storing n pack data DPAK, and the rear region R is composed of two regions RA and RB each storing n pack data DPAK. The main memory region M is set with a memory capacity for storing predetermined m pack data DPAK, and the general-purpose region NULL is set with a memory capacity for ably storing an arbitrary number of pack data DPAK.

The ring buffer memory 32 is handled as an endless memory with the logical head address AFW being linked to the logical end address ABW, and therefore, it forms a logical structure that, as shown in FIG. 5(c), the regions RB and FA are respectively positioned at the both sides of the general-purpose regions NULL and the main memory region M resides between the regions FB and RA. Thus, the pack data DPAK are stored and read out so as not to break this logical structure under the control of the address controllers 33 and 35, the data writing unit 34, and the data reading unit 36.

In other words, the pack data DPAK are stored by setting addresses relatively in the regions F, M, R, and NULL on the condition that the logical structure shown in FIGS. 5(b) and 5(c) will not be broken. It should be noted, however, that no pack data DPAK are stored in the general-purpose region NULL, so that it can function as a buffer region.

The audio editing unit 26 performs effects processing (edits processing) to impart various sound effects by modulating the playback data DAU2 supplied from the batch processing unit 24 in various manners as described above.

In other words, when the user specifies the desired modulation method by manipulating the manipulation keys 7a through 7f, 8a, and 8b, and the jog dial 4 shown in FIG. 1, the audio editing unit 26 performs the effects processing to impart various sound effects by modulating the playback data DAU2 according to the specified modulation method, and supplies the data DEF which have undergone the effects processing (hereinafter, referred to as the effect data) to the audio signal generating unit 27.

The audio signal generating unit 27 outputs the effect data DEF directly in the form of digital data or converts the effect data DEF into an analog audio signal in the audio frequency band by a digital-to-analog converter (not shown) to be outputted to an audio output terminal 28, thereby allowing a playback sound to be sounded from a speaker, a headphone, etc. connected to the audio output terminal 28 in the end.

Referring to FIG. 3 again, the system controller 29 is provided with a microprocessor (MPU), and performs central control of the operations of the overall audio editing apparatus 1 by running a preset system program.

Also, the system controller 29 inputs a detection signal STHS outputted from the aforementioned pressure sensing layer THS. In addition, the system controller 29 controls the display unit 3 and sends/receives data to/from a memory card inserted into the memory card slot 10. Further, the system controller 29 inputs command data from the manipulation keys 5a through 5h, 6a through 6f, 7a through 7f, 8a, and 8b provided to a manipulation unit 30 to control the disc playback unit 15 according to the command data.

Moreover, a memory unit 39 composed of a semiconductor memory and an angular velocity detecting unit 31 provided with a rotary encoder circuit (not shown) are connected to the system controller 29.

The memory unit 39 pre-stores target data DCNT for controlling the batch processing unit 24 in response to the detection signal STHS.

The angular velocity detecting unit 31 optically detects a rotational direction and a rotation speed (angular velocity) of the jog dial 4 by means of the rotary encoder circuit, and supplies detection data Sθ to the system controller 29.

Further, the system controller 29 checks the detection signal STHS from the pressure sensing layer THS and the detection data Sθ from the angular velocity detecting unit 31 described above one by one, and confirms the rotational direction and the rotational speed (angular velocity) of the jog dial 4, the absence or presence of a pressing manipulation, and a pressing pressure. Then, the system controller 29 judges which of aforementioned [Function 1] through [Function 5] needs to be performed in response to the rotational direction, the rotational speed (angular velocity), the absence or presence of a pressing manipulation, and a pressing pressure, and controls the batch processing unit 24 and the audio editing unit 26 to perform various kinds of effects processing based on the judging result.

Although the details will be described below, the system controller 29 controls the read address and the readout timing of the pack data DPAK stored in the ring buffer memory 32 in the batch processing unit 24 in response to the rotational direction, the rotational speed (angular velocity), the absence or presence of a pressing manipulation, and a pressing pressure.

Further, it will be described in detail below, when the pack data DPAK stored in the ring buffer memory 32 become insufficient, the system controller 29 directs the pickup servo circuit 20 and the spindle servo circuit 25 to move the pickup 17 so that it reads out update data from the optical disc 13 in updating the pack data DPAK to new pack data DPAK. Then, the system controller 29 directs the batch processing unit 24 to generate new pack data DPAK from the update data to be stored into the ring buffer memory 32. Consequently, it is possible to forestall the production of a discontinuous playback sound.

Figure 6:
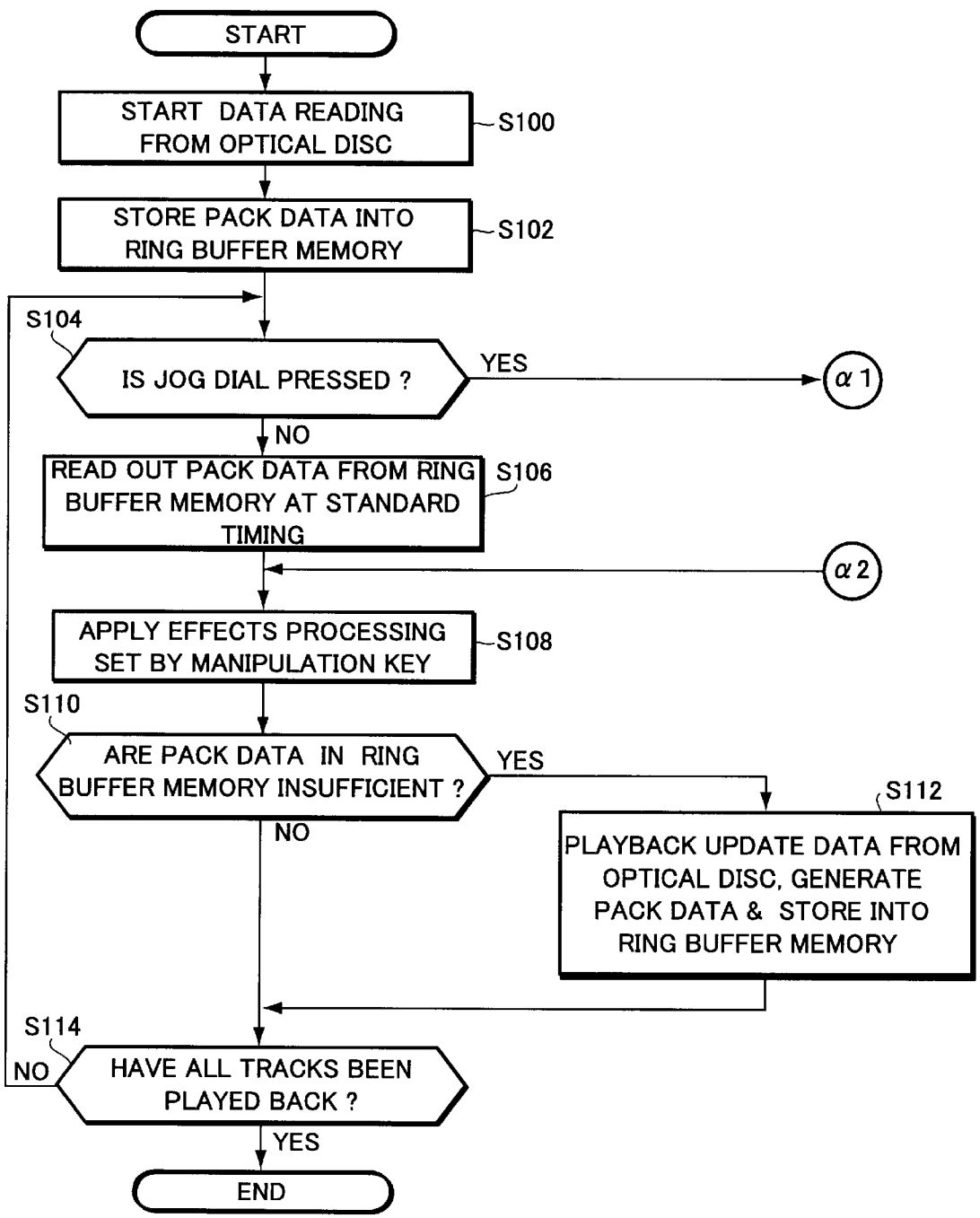
FIG. 6 is a flowchart detailing an operation of the audio editing apparatus.
Figure 7:
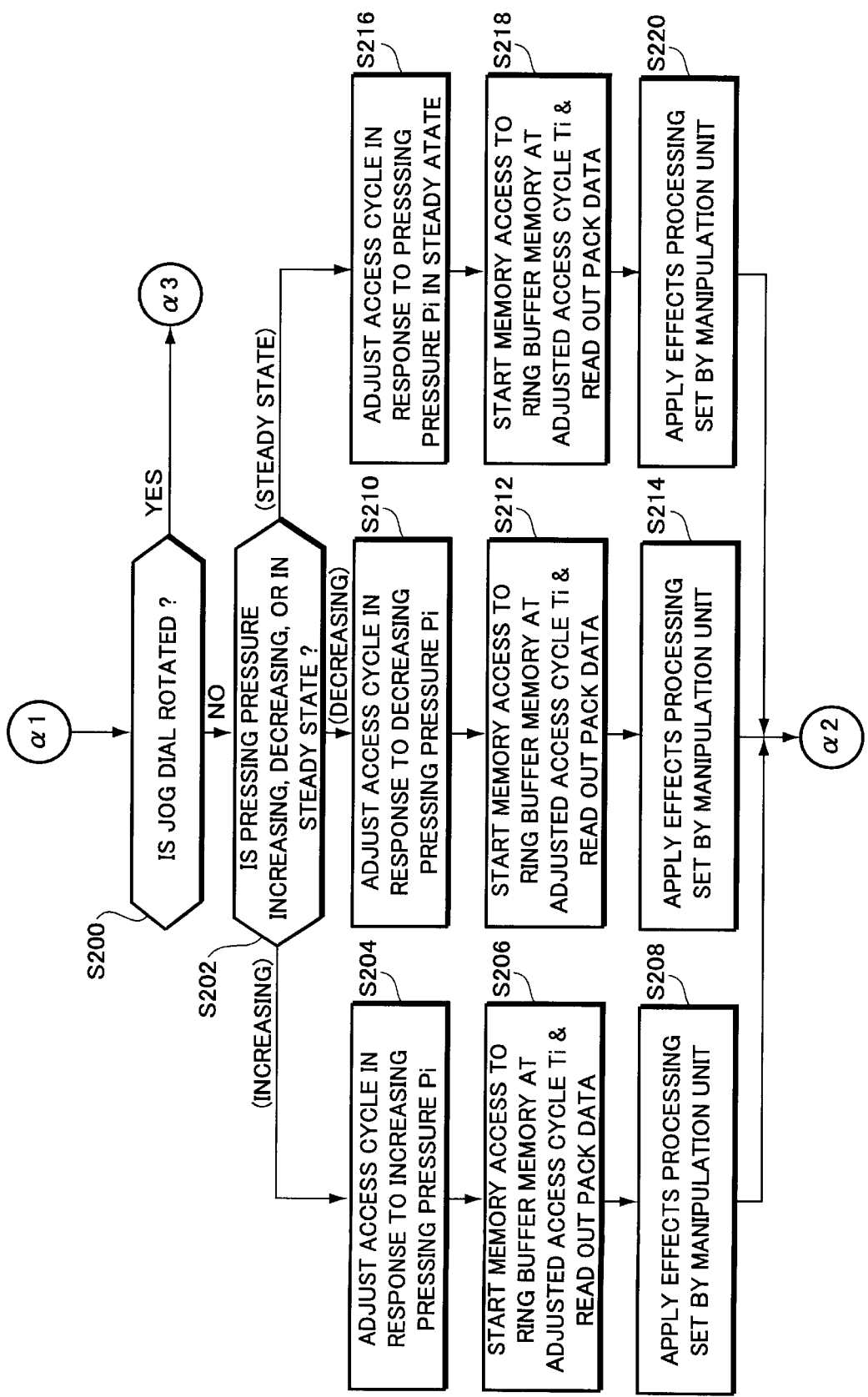
FIG. 7 is a flowchart further detailing the operation of the audio editing apparatus.
Figure 8:
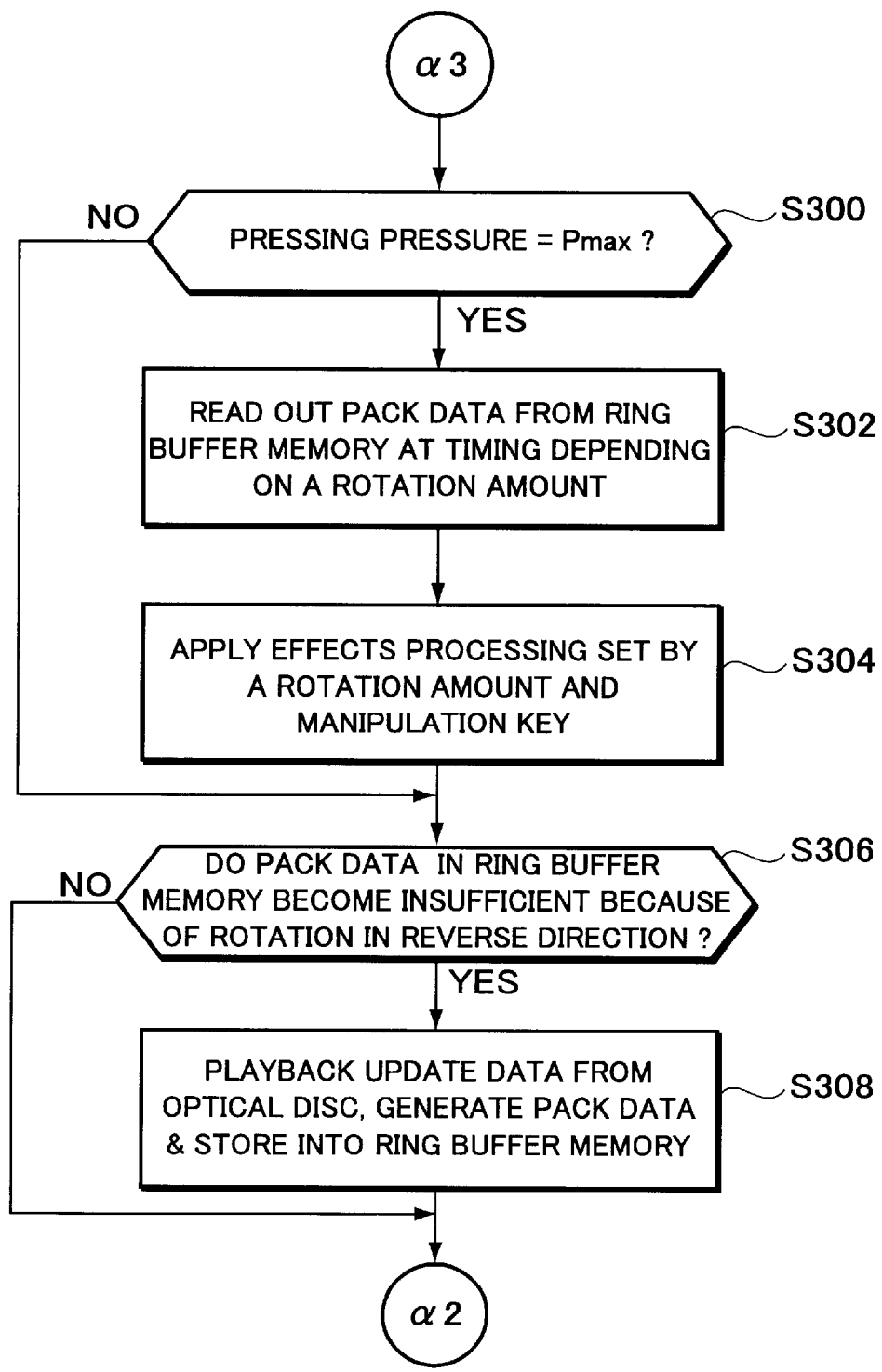
FIG. 8 is a flowchart further detailing the operation of the audio editing apparatus.

Next, the following description will describe an operation of the audio editing apparatus 1 arranged as above with reference to the flowcharts shown in FIGS. 6 through 8.

Referring to FIG. 6, when the user inserts the optical disc 13 through the disc insertion opening 14 and specifies to start the playing from the manipulation unit 30, the disc playback unit 15 starts a playback operation under the control of the system controller 29.

Initially, in Step S100, the spindle motor 16 and the pickup 17 are activated, whereupon the data reading from the optical disc 13 is started.

Further, in Step S102, the pack data replacing unit 38 generates the pack data DPAK by bringing the sub-code data DSB and the playback data DAU1 contained in the successively read out data in a one-to-one correspondence, and as shown in FIG. 5(b), stores the pack data DPAK successively into the front region F to the rear region R in the ring buffer memory 32. After the pack data DPAK are stored in the front region F, the main memory region M, and the rear region R, the flow proceeds to Step S104.

In Step S104, the system controller 29 compares the level of the detection signal STHS outputted from the pressure sensing layer THS with a predetermined threshold value, and judges whether the jog dial 4 is pressed or not. When the level of the detection signal STHS is lower than the predetermined threshold value, it is judged that the jog dial 4 is not pressed (in the case of NO), and the flow proceeds to Step S106. On the other hand, when the level of the detection signal STHS is higher than the predetermined threshold value, it is judged that the jog dial 4 is pressed (in the case of YES), and the flow proceeds to Step S200 shown in FIG. 7.

In Step S106, the system controller 29 specifies a read address in the ring buffer memory 32 with a read address control signal ADRR. At this point, the system controller 29 determines the following read address by checking preceding elapsed track time data DPQ outputted from the playback position detecting unit 41, and specifies the read address in the ring buffer memory 32 based on the read address thus determined.

Further, when the jog dial 4 is not pressed, the system controller 29 specifies a read address in the ring buffer memory 32 at a normal access cycle Ts, that is, an access cycle Ts corresponding to normal playback timing standardized in the optical disc 13. Then, the system controller 29 has the pack data DPAK be read out from the ring buffer memory 32.

Then, in Step S108, the pack data isolating unit 40 isolates the playback data DAU1 and the sub-code data DSB from the read out pack data DPAK, and supplies the playback data DAU1 to the audio editing unit 26 as the playback data DAU2 for generating a playback sound while supplying the sub-code data DSB to the playback position detecting unit 41.

Consequently, the audio editing unit 26 applies the effects processing to the playback data DAU2 according to the modulation method specified by the manipulation keys 7a through 7f, 8a, and 8b provided to the manipulation unit 30, and further, the audio signal generating unit 27 outputs an analog audio signal. Furthermore, the playback position detecting unit 41 generates the elapsed track time data DPQ from the Q channel code data in the sub-code data DSB and supplies the same to the system controller 29. Then, the system controller 29 determines the following read address based on the supplied elapsed track time data DPQ.

Then, in Step S110, whether the pack data DPAK stored in the ring buffer memory 32 are insufficient or not is judged. In other words, it is judged whether the forward playback by successively reading out the pack data DPAK stored in the ring buffer memory 32 causes the read address in the ring buffer memory 32 to come too close to the logical end address ABW side, so that the remaining pack data DPAK become insufficient to produce a playback sound if the pack data DPAK are kept read out successively.

When it is judged that the remaining pack data DPAK in the ring buffer memory 32 are sufficient to produce a playback sound (in the case of NO), the flow proceeds to Step S114. When it is judged that the remaining pack data DPAK stored in the ring buffer memory 32 are insufficient, the flow proceeds to Step S112, wherein update processing is performed to update the pack data DPAK stored in the ring buffer memory 32 to new pack data DPAK.

The update processing in Step S112 is performed as follows. For example, as shown in FIGS. 9(a) and 10(a), the pre-update ring buffer memory 32 stores the pack data DPAK generated from the data read out from a segment DW1 of the program region in the optical disc 13. Assume that a read address tch1 in the region RB shown in FIG. 9(a) is set, then insufficiency of the pack data DPAK is judged. In other words, insufficiency of the pack data DPAK is judged when the read address tch1 is positioned in the region RB closer to the logical end address ABW.

Then, the pack data DPAK in the regions RA and RB in FIGS. 9(a) and 10(b) are left intact, and as shown in FIGS. 9(b) and 10(b), they are updated to be the pack data DPAK in the post-update regions FA and FB.

Further, data which need to continually follow the playback data DAU1 contained in the pack data DPAK in the post-update region FB are judged based on the elapsed track time data DPQ, and the reading from the optical disc 13 by means of the pickup 17 is started. Then, the pack data DPAK newly generated from the read out data are overwritten on the post-update region FB from the back to be stored therein. Consequently, as shown in FIGS. 9(b) and 10(b), the post-update main memory region M and regions RA and RB are created subsequent to the post-update regions FA and FB.

Here, the pack data DPAK in the pre-update regions RA and RB are made into the pack data DPAK in the post-update regions FA and FB. Hence, the pickup 17 reads out only the data needed to store the pack data DPAK in the post-update main memory region M and regions RA and RB, that is, the data in a segment DW2 in the optical disc 13 shown in FIG. 9, which makes it possible to accelerate the update processing.

When the update processing is performed in this manner, the pack data DPAK in the pre-update regions RA and RB are left intact in the post-update regions FA and FB, and therefore, even when the addresses are set successively from the address tch1 by the read address controller 36 and a playback sound is produced based on the pack data DPAK read out therefrom, the playback sound will be continual. Consequently, it is possible to provide a high-quality playback sound.

Figure 9:
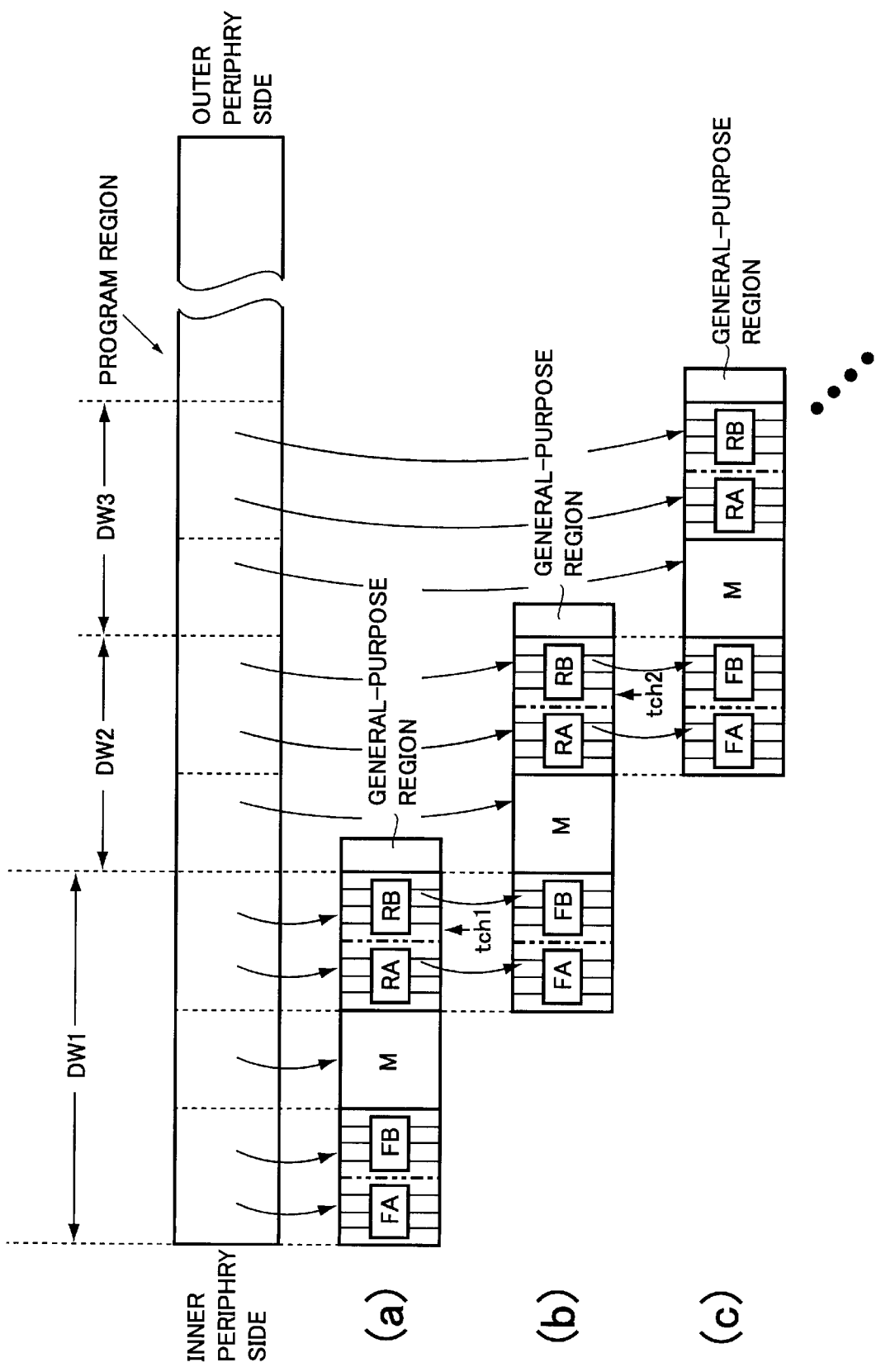
FIGS. 9(a) through 9(c) are views explaining update processing of pack data in the ring buffer memory, performed during forward playback.
Figure 10:
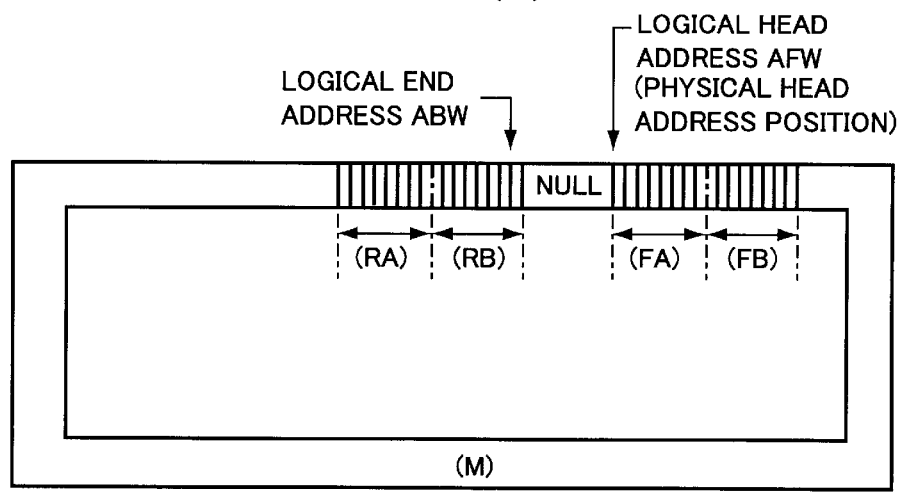
FIGS. 10(a) through 10(c) are views further explaining the update processing of the pack data in the ring buffer memory, performed during the forward playback.
Figure 10:
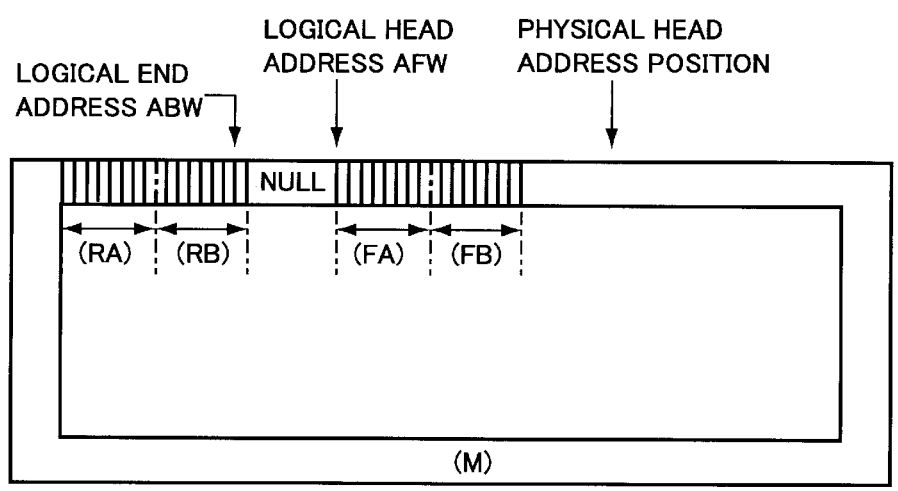
Figure 10:
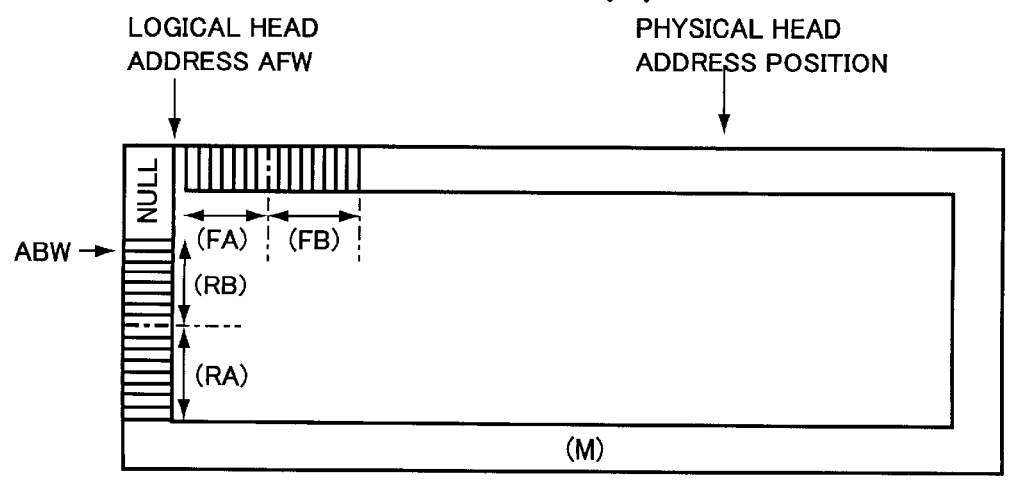

Also, when a read address tch2 in the region RB shown in FIG. 9(b) is set after the ring buffer memory 32 is updated as shown in FIGS. 9(b) and 10(b) and the pack data DPAK become insufficient, the update processing is performed in the same manner when the condition in FIGS. 9(a) and 10(a) is updated to the condition in FIGS. 9(b) and 10(b), whereby the ring buffer memory 32 is updated from the condition in FIGS. 9(b) and 10(b) to the condition in FIGS. 9(c) and 10(c). When the condition is updated to the condition in FIGS. 9(c) and 10(c), it is also possible to accelerate the update processing by allowing the optical pickup 17 to read out only the data necessary to store the pack data DPAK in the post-update main region M and regions RA and RB, that is, the data in a segment DW3 in the optical disc 13 shown in FIG. 9. Further, because the pack data DPAK are left in the post-update regions FA and FB, it is possible to provide a high-quality playback sound.

After the ring buffer memory 32 is updated with new pack data DPAK in this manner, the flow proceeds to Step S114.

In Step S114, whether all the tracks have been played back or not is judged, and if not, the processing is repeated from Step S104; otherwise, the processing is terminated.

As has been discussed, when the jog dial 4 is not pressed, the processing of aforementioned [Function 1] is performed.

Next, the following description will describe an operation when the flow proceeds to Step S200 in FIG. 7 from Step S104.

In Step 200, the system controller 29 checks a change in the detection data Sθ, and judges whether the jog dial 4 is rotated. When no change is detected in the detection data Sθ, it is judged that the jog dial 4 is not rotated, whereupon the flow proceeds to Step S202.

In Step S202, the system controller 29 checks a change in the detection signal STHS, and judges whether a pressing pressure onto the jog dial 4 is increasing or decreasing, or in a steady state where the jog dial 4 is kept pressed with a pressing pressure which is neither increasing nor decreasing. When the pressing pressure onto the jog dial 4 is increasing, the flow proceeds to Step S204, when the pressing pressure is decreasing, the flow proceeds to Step S210, and when the pressing pressure is in a steady state, the flow proceeds to Step S216.

When the flow proceeds to Step S204, the system controller 29 adjusts an access cycle Ti for specifying a read address in the ring buffer memory 32 in response to an increasing pressing pressure Pi.

The access cycle Ti is adjusted as follows.

As has been discussed above, the memory unit 39 shown in FIG. 3 stores the target data DCNT, and the target data DCNT are the data representing a characteristics curve CVDWN_RP shown in FIG. 11(a). Further, the characteristics curve CVDWN_RP represents a change in the pressing pressure Pi and a change in the number of revolutions RM of the turntable provided to an adequate analog record player when the user gradually presses the turntable turning at the normal number of revolutions until it stops, which has been measured experimentally.

The system controller 29 finds the number of revolutions RM corresponding to the pressing pressure Pi by applying the level of the detection signal STHS to the characteristics curve CVDWN_RP as the pressing pressure Pi. Further, the system controller 29 finds the access cycle Ti corresponding to the number of revolutions RM by applying the number of revolutions RM to a converting function CVDWN_RTs shown in FIG. 11(b) and representing a correspondence between the number of revolutions (RM) and the access cycle (Ti). Herein, the suffix i in both the pressing pressure Pi and the access cycle Ti is a variable indicating a sequential order for convenience's sake.

For instance, upon detection of a pressing pressure P2 from the detection signal STHS, the system controller 29 computes an access cycle T2 from the correspondences shown in FIGS. 11(a) and 11(b).

Upon detection of the large pressing pressure Pmax such which stops the turning turntable provided to an analog recorder player, the system controller 29 sets an infinite value to the access cycle Ti from the correspondence shown in FIGS. 11(a) and 11(b)

Further, when the aforementioned manipulation key 7e is adjusted, the system controller 29 changes the characteristics of the converting function CVDWN_RTs shown in FIG. 11(b) to those of a converting function CVDWN_RTDEC or CVDWN_RTINC in response to the adjusted resistance value. To be more specific, when the resistance value of the manipulation key 7e increases, the characteristics of the converting function CVDWN_RTs are changed to those of the converting function CVDWN_RTINC, and when the resistance value of the manipulation key 7e decreases, the characteristics of the converting function CVDWN_RTs are changed to those of the converting function CVDWN_RTDEC. Hence, because the characteristics when converting the number of revolutions RM obtained from the characteristics curve CVDWN_RP shown in FIG. 11(a) to the access cycle Ti are adjusted variably, the access cycle Ti with respect to the pressing pressure Pi is adjusted variably in response to the resistance value of the manipulation key 7e.

Then, in Step S206, the system controller 29 outputs the read address control signal ADRR at the adjusted access cycle Ti and specifies the read address in the ring buffer memory 32, whereby the pack data DPAK are read out from the ring buffer memory 32.

Then, in Step S208, the pack data isolating unit 40 isolates the playback data DAU1 and the sub-code data DSB from the read out pack data DPAK, and supplies the playback data DAU1 to the audio editing unit 26 as the playback data DAU2 for producing a playback sound while supplying the sub-code data DSB to the playback position detecting unit 41.

Consequently, the audio editing unit 26 applies the effects processing to the playback data DAU2 according to the modulation method specified by the manipulation keys 7a through 7f, 8a, and 8b provided to the manipulation unit 30, and further, the audio signal generating unit 27 outputs an analog audio signal. Furthermore, the playback position detecting unit 41 generates the elapsed track time data DPQ from the Q channel code data in the sub-code data DSB, and supplies the same to the system controller 29.

Then, the flow proceeds to Step 110 in FIG. 6 to repeat the processing.

By repeating the processing in Steps S104, S200, S202, and S204 through S208 in this manner, the processing when the user increases a pressing pressure onto the job dial 4 is performed. Hence, as shown in FIG. 11(c), the access cycle Ti when reading out the pack data DPAK from the ring buffer memory 32 changes in response to the pressing pressure Pi.

Accordingly, the input timing of the playback data DAU2 inputted into the audio editing unit 26 and then to the audio signal generating unit 27 differs from the normal timing in response to a change in the access cycle Ti, which changes a tempo of the audio signal outputted from the audio signal generating unit 27 in response to the pressing pressure Pi.

When the access cycle Ti is changed to a cycle different from the normal access cycle Ts in response to the pressing pressure Pi, the input timing of the playback data DAU2 shifts from the sampling cycle of the digital-to-analog converter provided to the audio signal generating unit 27, which changes a tempo of the audio signal in response to the pressing pressure Pi.

Also, FIG. 11(c) shows a change in the access cycle Ti in the case of aforementioned [Function 3]. In other words, when an end of the jog dial 4 at rest is pressed with a large pressing pressure, a condition where memory access to the ring buffer memory 32 is performed at the normal access cycle Ts is changed, so that the access cycle Ti extends gradually with an increase of the pressing pressure Pi, for example, and when the pressing pressure Pi reaches the large pressing pressure Pmax, the access cycle Ti becomes infinite, whereupon memory access to the ring buffer memory 32 is stopped.

Hence, the user can feel as if he/she forcefully stopped the turntable of an analog record player by pressing the turntable, and it is possible to produce the same sound effects obtained when the number of revolutions of the turntable is reduced gradually.

FIG. 11(c) shows a case when the jog dial 4 is pressed with the large pressing pressure Pmax in the end. However, when the jog dial 4 is kept pressed with the pressing pressure Pi smaller than the pressing pressure Pmax, memory access to the ring buffer memory 32 is not stopped, and instead, the memory access is continued at the access cycle Ti corresponding to the pressing pressure Pi which is kept applied.

Hence, the user can feel as if he/she were producing a playback sound by slowing down the turntable. In short, it is possible to achieve the advantages of aforementioned [Function 2].

Then, when the pressing pressure is judged as being decreasing in Step S202 in FIG. 7 and the flow proceeds to Step S210, the access cycle Ti for specifying a read address in the ring buffer memory 32 is adjusted in response to a decreasing pressing pressure Pi.

The access cycle Ti is adjusted as follows.

As has been discussed, the memory unit 39 shown in FIG. 3 stores the target data DCNT, and the target data DCNT includes, besides the data representing the characteristics curve CVDWN_RP shown in FIG. 11(a), data representing a characteristics curve CVUP_RP shown in FIG. 12(a). The characteristics curve CVUP_RP represents a change in a pressing pressure Pi and a change in the number of revolutions RM of the turntable provided to an adequate analog record player when the user gradually decreases a pressing pressure onto the turntable until he/she finally moves his/her hand off the turntable while keeping the turntable stopped forcefully, which has been measured experimentally.

The system controller 29 finds the number of revolutions RM corresponding to the pressing pressure Pi by applying the level of the detection signal STHS to the characteristics curve CVUP_RP as the pressing pressure Pi. Further, the system controller 29 finds the access cycle Ti corresponding to the number of revolutions RM by applying the number of revolutions RM to a converting function CVUP_RTs shown in FIG. 12(*b*) and representing a correspondence between the number of revolutions (RM) and the access cycle (Ti).

For instance, upon detection of a pressing pressure P5 from the detection signal STHS, the system controller 29 computes an access cycle T5 from the correspondence in FIGS. 12(*a*) and 12(*b*).

Also, when the user moves his/her hand off the jog dial 4 completely and the pressing pressure Pi becomes 0, the system controller 29 sets the access cycle Ti to the normal access cycle Ts from the correspondence in FIGS. 12(*a*) and 12(*b*).

Further, when the manipulation key 7*f* shown in FIG. 1 is adjusted, the system controller 29 changes the characteristics of the converting function CVUP_RTs shown in FIG. 12(*b*) to those of a converting function CVUP_RTDEC or CVUP_RTINC in response to the adjusted resistance value. To be more specific, when a resistance value of the manipulation key 7*f* increases, the characteristics of the converting function CVUP_RTs are changed to those of the converting function CVUP_RTINC, and when the resistance value of the manipulation key 7*f* decreases, the characteristics of the converting function CVUP_RTs are changed to those of the converting function CVUP_RTDEC. Consequently, because the characteristics when converting the number of revolutions RM obtained from the characteristics curve CVUP_RP in FIG. 12(*a*) to the access cycle Ti are variably adjusted, the access cycle Ti with respect to the pressing pressure Pi is variably adjusted in response to the resistance value of the manipulation key 7*f*.

Then, in Step S212, the system controller 29 outputs the read address control signal ADRR at the adjusted access cycle Ti and specifies the read address in the ring buffer memory 32, whereby the pack data DPAK are read out from the ring buffer memory 32.

Then, in Step S214, the pack data isolating unit 40 isolates the playback data DAU1 and the sub-code data DSB from the read out pack data DPAK, and supplies the playback data DAU1 to the audio editing unit 26 as the playback data DAU2 for producing a playback sound while supplying the sub-code data DSB to the playback position detecting unit 41.

Consequently, the audio editing unit 26 applies the effects processing to the playback data DAU2 according to the modulation method specified by the manipulation keys 7*a* through 7*f*, 8*a*, and 8*b* provided to the manipulation unit 30, and further, the audio signal generating unit 27 outputs an analog audio signal. Furthermore, the playback position detecting unit 41 generates the elapsed track time data DPQ from the Q channel code data in the sub-code data DSB and supplies the same to the system controller 29.

Then, the flow proceeds to Step S110 in FIG. 6 to repeat the processing.

By repeating the processing in Steps S104, S200, S202, and S210 through S214 in this manner, the processing when the user decreases a pressing pressure onto the job dial 4 is performed. Hence, as shown in FIG. 12(*c*), the access cycle Ti when reading out the pack data DPAK from the ring buffer memory 32 changes in response to the pressing pressure Pi.

Accordingly, the input timing of the playback data DAU2 inputted into the audio editing unit 26 and then to the audio signal generating unit 27 differs from the normal timing in response to a change in the access cycle Ti, which changes a tempo of the audio signal outputted from the audio signal generating unit 27 in response to the pressing pressure Pi.

When the access cycle Ti is changed to a cycle different from the normal access cycle Ts in response to the pressing pressure Pi, the input timing of the playback data DAU2 shifts from the sampling cycle of the digital-to-analog converter provided to the audio signal generating unit 27, which changes a tempo of the audio signal in response to the pressing pressure Pi.

Also, FIG. 12(*c*) shows a change in the access cycle Ti in the case of aforementioned [Function 4]. In other words, when the user moves his/her hands off the jog dial 4 while pressing an end of the jog dial 4 at rest with the large pressing pressure Pmax, a condition where memory access to the ring buffer memory 32 is suspended shifts to a condition where the memory access is resumed at the access cycle Ti in response to the pressing pressure Pi, so that the access cycle Ti shortens gradually with a decrease of the pressing pressure Pi, for example, and the access cycle Ti becomes the normal access cycle Ts in the end.

Hence, the user can feel as if he/she were moving his/her hand off the forcefully stopped turntable of an analog record player, and it is possible to produce the same sound effects obtained when the number of revolutions of the turntable is increased gradually.

FIG. 12(*c*) shows a case when the user moves his/her hand off the jog dial 4 in the end. However, when the jog dial 4 is kept pressed with the pressing pressure Pi smaller than the pressing pressure Pmax, memory access is continued at the access cycle Ti corresponding to the pressing pressure Pi which is kept applied.

Hence, the user can feel as if he/she were producing a playback sound by slowing down the turntable. In short, it is possible to achieve the advantages of aforementioned [Function 2].

Then, in Step S202 in FIG. 7, when the pressing pressure is judged as being in a steady state and the flow proceeds to Step S216, the system controller 29 adjusts the access cycle Ti for specifying a read address in the ring buffer memory 32 in response to the pressing pressure Pi in a steady state.

When the user increases a pressing pressure up to a certain pressing pressure and keeps the certain pressing pressure, as has been described with reference to FIGS. 11(*a*) and 11(*b*), the access cycle Ti in response to the pressing pressure Pi in a steady state is set according to the characteristics curve CVDWN_RP and the converting function CVDWN_RTs. On the other hand, when the user decreases a pressing pressure to a certain pressing pressure and keeps the certain pressing pressure, as has been described with reference to FIGS. 12(*a*) and 12(*b*), the access cycle Ti in response to the pressing pressure Pi in a steady state is set according to the characteristics curve CVUP_RP and the converting function CVUP_RTs.

Then, in Step S218, the system controller 29 outputs the read address control signal ADRR at the adjusted access cycle Ti and specifies the read address in the ring buffer memory 32, whereby the pack data DPAK are read out from the ring buffer memory 32.

Then, in Step S220, the pack data isolating unit 40 isolates the playback data DAU1 and the sub-code data DSB from the read out pack data DPAK, and supplies the playback data DAU1 to the audio editing unit 26 as the playback data DAU2 for producing a playback sound while supplying the sub-code data DSB to the playback position detecting unit 41.

Consequently, the audio editing unit 26 applies the effects processing to the playback data DAU2 according to the modulation method specified by the manipulation keys 7a through 7f, 8a, and 8b provided to the manipulation unit 30, and further, the audio signal generating unit 27 outputs an analog audio signal. Furthermore, the playback position detecting unit 41 generates the elapsed track time data DPQ from the Q channel code data in the sub-code data DSB and supplies the same to the system controller 29.

Then, the flow proceeds to Step S110 shown in FIG. 6 to repeat the processing.

By repeating the processing in Steps S104, S200, S202, and S216 through S220 in this manner, the user can feel as if he/she were producing a playback sound by slowing down the turntable. In short, it is possible to achieve the advantages of aforementioned [Function 2]

By performing the processing in Steps S200 through S220 in FIG. 7, there can be offered the advantages as follows.

Figure 13:
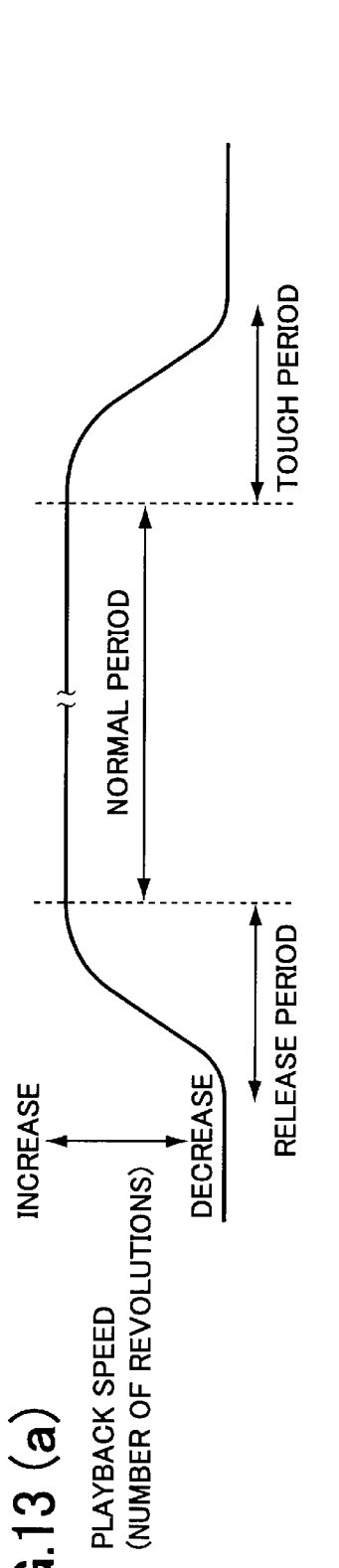
FIGS. 13(a) through 13(c) are views explaining advantages attained when the jog dial is pressed.
Figure 13:
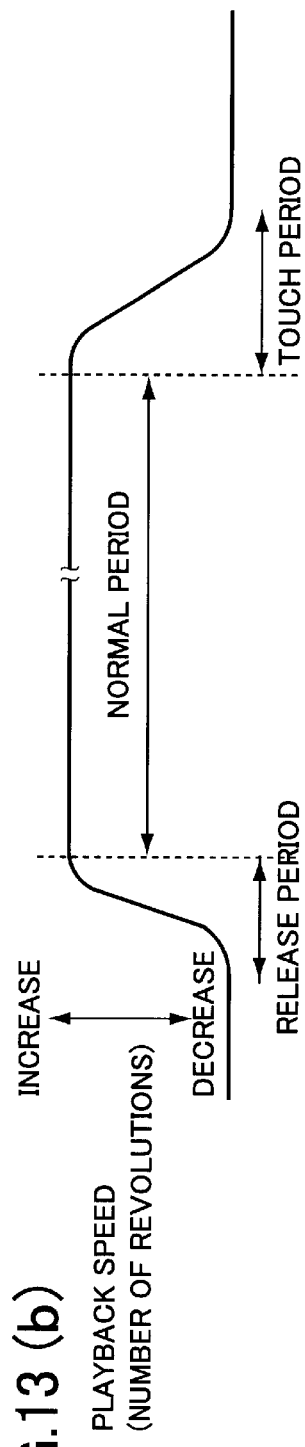
Figure 13:
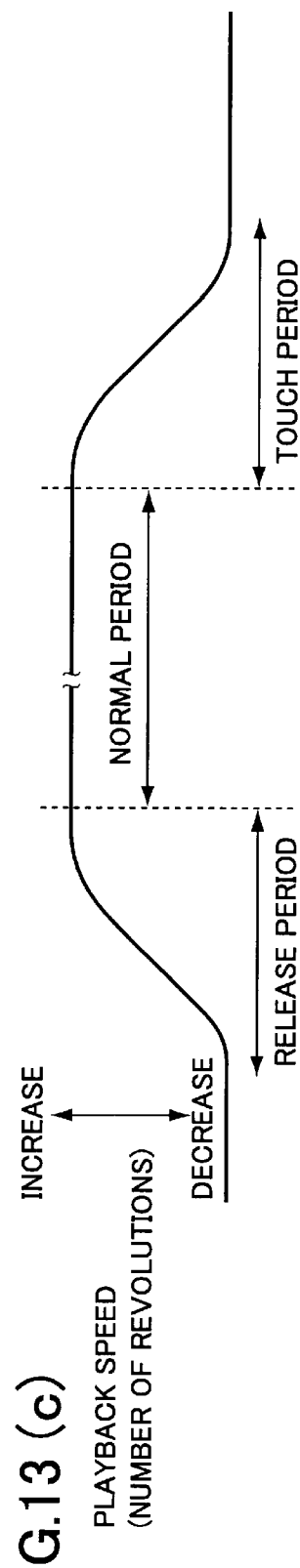

That is, when the user moves his/her hand off the forcefully stopped turntable of an analog record player, as schematically shown in FIGS. 13(a) through 13(c), the turntable moves in a distinctive manner during a "release period" until it returns to the normal number of revolutions, which produces distinctive sound effects as a result. Similarly, according to the processing in Steps S204 through S208, it possible to produce the same sound effects produced by the movement of the turntable during the "release period".

Also, when the user forcefully stops the turntable of an analog record player while it is turning at the normal number of revolutions, the turntable turning at the normal number of revolutions moves in a distinctive manner during a "touch period" until it stops, which produces distinctive sound effects as a result. Similarly, according to the processing in Steps S210 through S214, it is possible to produce the same sound effects produced by the movement of the turntable during the "touch period".

Also, when the manipulation key 7e shown in FIG. 1 is adjusted, the system controller 29 changes the characteristics of the converting function CVDWN_RTs shown in FIG. 11(b) to those of the converting function CVDWN_RTDEC or CVDWN_RTINC in response to the adjusted resistance value. To be more specific, when the resistance value of the manipulation key 7e increases, the characteristics of the converting function CVDWN_RTs are changed to those of the converting function CVDWN_RTINC, and when the resistance value of the manipulation key 7e decreases, the characteristics of the converting function CVDWN_RTs are changed to those of the converting function CVDWN_RTDEC. Consequently, because the characteristics when converting the number of revolutions RM obtained from the characteristics curve CVDWN_RP in FIG. 11(a) to the access cycle Ti are variably adjusted, it is possible to generate the same sound effects produced when the "release period" of the turntable is changed as shown in FIGS. 13(b) and 13(c).

Also, when the manipulation key 7f shown in FIG. 1 is adjusted, the system controller 29 changes the characteristics of the converting function CVUP_RTs shown in FIG. 12(b) to those of the converting function CVUP_RTDEC or CVUP_RTINC in response to the adjusted resistance value.

To be more specific, when the resistance value of the manipulation key 7f increases, the characteristics of the converting function CVUP_RTs are changed to those of the converting function CVUP_RTINC, and when the resistance value of the manipulation key 7f decreases, the characteristics of the converting function CVUP_RTs are changed to those of the converting function CVUP_RTDEC. Consequently, because the characteristics when converting the number of revolutions RM obtained from the characteristics curve CVUP_RP in FIG. 12(a) to the access cycle Ti are variably adjusted, it is possible to generate the same sound effects produced when the "touch period" of the turntable is changed as shown in FIGS. 13(b) and 13(c).

Then, when the jog dial 4 is judged as being rotated in Step S200 in FIG. 7, the flow proceeds to Step S300 shown in FIG. 8.

In Step S300, the system controller 29 judges whether the level of the detection signal STHS corresponds to the large pressing pressure Pmax, and when it does not correspond to the pressing pressure Pmax (in the case of NO), the flow skips to Step S306.

On the other hand, when the level of the detection signal STHS corresponds to the large pressing pressure Pmax (in the case of YES), the flow proceeds to Step S302, wherein the system controller 29 specifies a read address in the ring buffer memory 32 depending on a quantity of rotation (a rotational direction and an angular velocity) of the jog dial 4, and reads out the pack data DPAK from the ring buffer memory 32 at the specified read address. To be more specific, when the jog dial 4 is rotated clockwise, an address in the ring buffer memory 32 shown in FIG. 5(b) is shifted toward the logical end address ABW in response to the angular velocity, and when the jog dial 4 is rotated counterclockwise, an address is shifted toward the logical head address AFW in response to the angular velocity. Then, in Step S304, the pack data isolating unit 40 isolates the playback data DAU1 and the sub-code data DSB from the read out pack data DPAK, and supplies the playback data DAU1 to the audio editing unit 26 as the playback data DAU2 for generating a playback sound while supplying the sub-code data DSB to the playback position detecting unit 41.

Consequently, the audio editing unit 26 applies the effects processing specified by the manipulation keys 7a through 7f, 8a, and 8b and the effects processing depending on a quantity of rotation of the jog dial 4, and further, the audio signal generating unit 27 outputs an analog audio signal.

To be more specific, when the jog dial 4 is rotated clockwise, sound effects modulated in the forward playback condition are outputted based on the playback data DAU2 read out in the forward direction in response to a rotational speed, and when the jog dial 4 is rotated counterclockwise, an imitation sound modulated in the reverse playback condition is outputted based on the playback data DAU2 read out in the reverse direction in response to a rotational speed.

When the jog dial 4 is rotated clockwise and counterclockwise in a reciprocating manner, a modulated imitation sound (scratching sound) is outputted based on the playback data DAU2 read out in the forward direction and in the reverse direction in response to a rotational speed.

Further, the playback position detecting unit 41 generates the elapsed track time data DPQ from the Q channel code data in the sub-code data DSB, and supplies the same to the system controller 29.

Then, in Step S306, it is judged whether the pack data DPAK in the ring buffer memory 32 become insufficient because the jog dial 4 is rotated counterclockwise. When insufficiency of the pack data DPAK is not judged (in the case of NO), the flow proceeds to Step S110 shown in FIG. 6 to repeat the processing.

On the other hand, when insufficiency of the pack data DPAK is judged (in the case of YES), the flow proceeds to Step S308, wherein update processing to update the pack data DPAK in the ring buffer memory 32 is performed.

The update processing is performed as follows.

Figure 14:
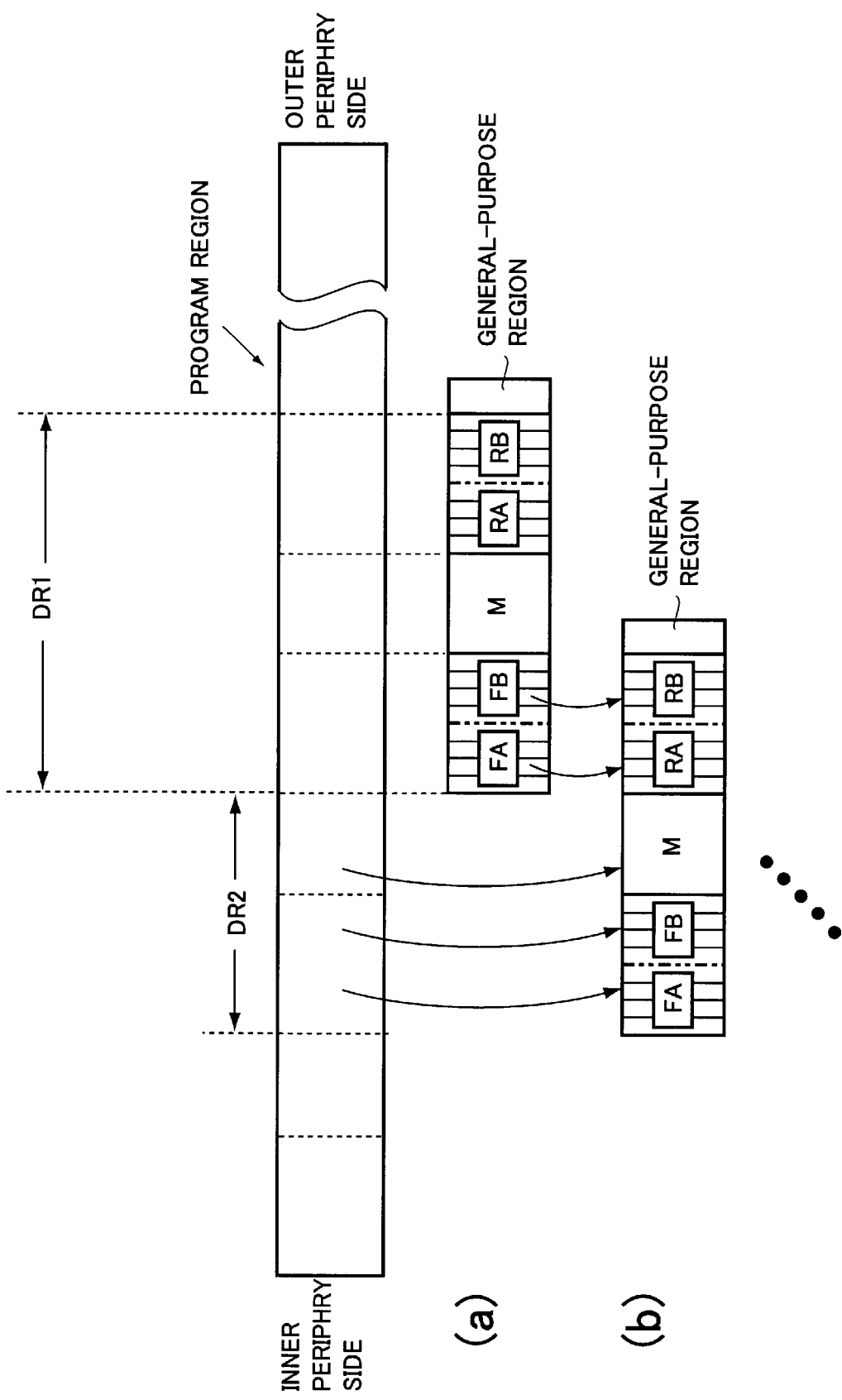
FIGS. 14(a) and 14(b) are views explaining update processing of the pack data in the ring buffer memory, performed during reverse playback.

That is, as shown in FIG. 14(a), for example, when the pack data DPAK generated from the data in a segment DR1 of the program region in the optical disc 13 are stored in the ring buffer memory 32 and the read address is in the region FA closer to the logical head address AFW, the update processing during the reverse playback is performed. Then, as shown in FIG. 14(b), the pack data DPAK stored in the regions FA and FB in the front region F are left intact, and the regions FA and FB are set as the post-update regions RA and RB. Further, the general-purpose region NULL is set subsequent to the post-update regions RA and RB.

Further, data necessary to store the pack data DPAK into the post-update regions FA and FB and main memory region M are read out from a segment DR2 in the optical disc 13, and the pack data DPAK newly generated from the playback data DAU1 and the sub-code data DSB contained in the read out data are stored successively at the addresses after the general-purpose region NULL. Consequently, the pre-update ring buffer memory 32 in the condition of FIG. 14(a) is updated to the condition of FIG. 14(b), whereby the post-update regions FA and FB and main memory region M are set subsequent to the general-purpose region NULL.

In this manner, the pack data DPAK stored in the regions FA and FB in the front region F are set as those in the post-update regions RA and RB, and only the data necessary to store the pack data DPAK in the post-update regions FA and FB and main memory region M are read out from the segment DR2 also in the update processing during the reverse playback. Hence, as was in the update processing during the forward playback, it is possible to accelerate the update processing.

When the update processing described above is terminated, the flow proceeds to Step S110 shown in FIG. 6 to repeat the processing.

As has been described above, according to the audio editing apparatus 1 of the present embodiment, when the user presses the jog dial 4, the access cycle Ti for the memory access to the ring buffer memory 32 is changed in response to a pressing pressure, and so is the readout timing of the pack data DPAK, which makes it possible to change a tempo of a playback sound played back based on the playback data DAU1 (DAU2) contained in the pack data DPAK. Hence, the user can feel as if he/she were changing the number of revolutions of the turntable of an analog record player, stopping the turning turntable, or turning the stopped turntable again by hand.

Further, as was explained with [Function 3], when the user presses an end of the jog dial 4 at rest with the large pressing pressure Pmax, there can be attained novel advantages that it is possible to generate the same sound effects obtained when the turning turntable of an analog record player is forcefully stopped. Also, the sound effects can be changed in various manners by adjusting the manipulation key 7e.

Also, as was explained with [Function 4], when the user moves his/her hand off the jog dial 4 at rest while pressing the same with the large pressing pressure Pmax, there can be attained novel advantages that it is possible to generate the same sound effects generated when the user moves his/her hand off the forcefully stopped turntable of an analog record player, so that the turntable starts to turn again to resume playing an analog record. Also, the sound effects can be changed in various manners by adjusting the manipulation key 7f.

Although it is not explained with the flowcharts in FIGS. 6 through 8, when the user specifies a cue point to start the playback by the manipulation keys 5c, 5d, and 5e called the cue buttons while pressing the jog dial 4 at rest with the large pressing pressure Pmax and then moves his/her hand off the jog dial 4, there can be attained the advantages of [Function 4] when the playback is started at the position of the cue point.

As has been described, according to the audio editing apparatus 1 of the present embodiment, there can be attained excellent advantages that not only can the effects processing be applied in much the same way an analog record player is manipulated, but also various sound effects can be generated even when a storage medium, such as a CD and a DVD, is used.

The present embodiment described the case where the data stored in a CD or a DVD are played back. It should be appreciated, however, that applications of the present invention are not limited to such a storage medium, and for example, the present invention is applicable when playing back information stored in other storage media including, for example an MD (Mini Disc) and a hard disc. Also, the present invention is applicable when playing back information stored in a storage medium incorporating a solid-state memory, such as a memory card.

As has been explained, according to the information playback apparatus of the present invention, it is possible to generate the same sound effects obtained when the manipulator turns the turntable of an analog record player at varying number of revolutions by touching or applying a pressing pressure or the like to the turntable, stops the turning turntable by applying a pressing pressure or the like, allows the turntable forcefully stopped with a pressing pressure or the like applied thereon to resume turning by removing the pressing pressure or the like. Hence, it is possible to provide the manipulator with the feeling as if he/she were manipulating the turntable of an analog record player.

Because a tempo of a playback sound is changed in response to the level of the detection signal which is increasing or decreasing, a tempo of a playback sound is changed when a pressing pressure or the like is increased or decreased. Hence, it is possible to generate the same sound effects obtained when the manipulator moves his/her hand off the stopped turntable or stops the turning turntable by hand, and it is also possible to provide the manipulator with the feeling as if he/she were manipulating the turntable of an analog record player.

Also, because the adjusting device for adjusting a quantity of change when a tempo of a playback sound is changed in response to the level of the detection signal is provided, even when the same pressing pressure or the like is applied onto the manipulation unit, by pre-adjusting the quantity of change with the adjusting device, it is possible to provide versatility that a tempo of a playback sound can be changed, and it is also possible to provide versatility that sound effects can be generated as same as those obtained when the manipulator changes the movement of the turntable by moving his/her hand off the stopped turntable or when the manipulator changes the movement of the turntable by stopping the turning turntable by hand.

When the level of the detection signal has increased to exceed a predetermined value, the production of a playback sound is stopped. Hence, it is possible to generate the same sound effects obtained when the turning turntable is stopped by hand in such a manner that the number of revolutions of the turntable is reduced gradually to stop the turntable eventually until a playback sound is no longer played, and it is also possible to provide the manipulator with the feeling as if he/she stopped the turning turntable of an analog record player by pressing the turntable.

Also, because the detecting device is provided to a rotatable rotary body, it is possible to provide the manipulator with the feeing as if he/she were pressing the turntable of an analog record player.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information playback apparatus for producing a playback sound, sound effects being imparted to the playback sound by applying an editing process to audio information fed from a source, said apparatus comprising:

detecting device for detecting an absence or a presence of a physical touch or a pressing pressure on a manipulation unit and outputting a detection signal; and editing device for changing a tempo of said playback sound in response to a level of said detection signal outputted from said detecting device.

2. The information playback apparatus according to claim 1, wherein said editing device changes the tempo of said playback sound in response to the increasing or decreasing level of said detection signal.

3. The information playback apparatus according to claim 1, further comprising an adjusting system for adjusting a quantity of change when the tempo of said playback sound is changed in response to the level of said detection signal.

4. The information playback apparatus according to claim 1, wherein said editing device stops producing said playback sound when the level of said detection signal has increased to exceed a predetermined value.

5. The information playback apparatus according to claim 1, wherein said detecting device is provided to a rotatable rotary body for detecting a pressing pressure applied onto said rotary body.

* * * * *